(12) United States Patent
Parry et al.

(10) Patent No.: US 12,254,783 B2
(45) Date of Patent: *Mar. 18, 2025

(54) WOUND BOX TRAINER

(71) Applicant: Techline Technologies, Inc., Willow Grove, PA (US)

(72) Inventors: Daniel J. Parry, Perkasie, PA (US); David J. Parry, Jr., Yardley, PA (US); Anthony R. Grillo, Coatesville, PA (US); Thomas D. Kelly, Bryn Mawr, PA (US)

(73) Assignee: Techline Technologies, Inc., Willow Grove, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,167

(22) Filed: Jan. 16, 2024

(65) Prior Publication Data

US 2024/0203289 A1 Jun. 20, 2024

Related U.S. Application Data

(63) Continuation of application No. 18/111,629, filed on Feb. 20, 2023, now Pat. No. 11,915,611, which is a continuation of application No. 17/517,017, filed on Nov. 2, 2021, now Pat. No. 11,631,343, said application No. 16/806,595 is a continuation of application No. 16/806,219, filed on Mar. 2, 2020, now Pat. No. 11,195,434, said application No. 17/517,017 is a continuation of application No. 16/806,595, filed on Mar. 2, 2020, now Pat. No. 11,195,435, said application No. 16/806,219 is a continuation-in-part of application No. 16/429,202, filed on Jun. 3, 2019, now Pat. No. 10,586,470, which is a continuation of application No. 16/244,735, filed on Jan. 10, 2019, now Pat. No. 10,535,282, which is (Continued)

(51) Int. Cl.
*G09B 23/30* (2006.01)
*G09B 23/32* (2006.01)

(52) U.S. Cl.
CPC .......... *G09B 23/303* (2013.01); *G09B 23/32* (2013.01)

(58) Field of Classification Search
CPC ...... G09B 23/28; G09B 23/30; G09B 23/303; G09B 23/34
See application file for complete search history.

(56) References Cited

U.S. PATENT DOCUMENTS

| | | | | |
|---|---|---|---|---|
| 3,027,655 A | * | 4/1962 | Alderson | G09B 23/32 434/268 |
| 3,852,893 A | * | 12/1974 | Smrcka | G09B 23/32 264/DIG. 14 |

(Continued)

*Primary Examiner* — Kurt Fernstrom
(74) *Attorney, Agent, or Firm* — Michael Crilly, Esquire

(57) ABSTRACT

A device for medical training purposes is presented. The wound trainer includes a compressible body, a wound structure, and an annular cavity. The compressible body simulates portion of a body. The compressible body includes a top surface. The wound structure is disposed along the compressible body. The wound structure includes a wound cavity which extends from the top surface and into the compressible body. The annular cavity extends into the compressible body about the wound cavity. The annular cavity permits movement or expansion of a wall defined by and disposed between the wound cavity and the annular cavity.

20 Claims, 19 Drawing Sheets

Related U.S. Application Data a continuation-in-part of application No. 15/144,007, filed on May 2, 2016, now Pat. No. 10,217,380.

(56) References Cited

U.S. PATENT DOCUMENTS

| | | | | |
|---|---|---|---|---|
| 6,234,804 | B1* | 5/2001 | Yong | G09B 23/34 |
| | | | | 434/274 |
| 6,241,525 | B1* | 6/2001 | Spitalnik | G09B 23/28 |
| | | | | 434/262 |
| 7,850,454 | B2* | 12/2010 | Toly | G09B 23/285 |
| | | | | 434/262 |
| 7,887,330 | B2* | 2/2011 | King | G09B 23/303 |
| | | | | 434/268 |
| 9,240,130 | B2* | 1/2016 | Carvajal | G09B 23/288 |
| 10,726,744 | B2* | 7/2020 | Benson | G09B 23/285 |
| 10,885,813 | B2* | 1/2021 | Krummenacher | G09B 23/30 |
| 10,909,885 | B2* | 2/2021 | Eichhorn | G09B 23/34 |
| 2009/0011394 | A1* | 1/2009 | Meglan | G09B 23/28 |
| | | | | 434/268 |
| 2010/0196865 | A1* | 8/2010 | Kays | G09B 23/32 |
| | | | | 434/268 |
| 2010/0311025 | A1* | 12/2010 | Everett | C08L 89/04 |
| | | | | 106/156.51 |
| 2013/0224712 | A1* | 8/2013 | Day | A61K 35/12 |
| | | | | 434/268 |
| 2013/0274688 | A1* | 10/2013 | Weston | A61M 1/96 |
| | | | | 604/315 |
| 2016/0300509 | A1* | 10/2016 | Spotnitz | G09B 23/28 |
| 2017/0053563 | A1* | 2/2017 | Holloway | G09B 23/28 |
| 2017/0193858 | A1* | 7/2017 | Segall | G09B 23/303 |
| 2017/0345339 | A1* | 11/2017 | Normand | G09B 23/28 |
| 2018/0012515 | A1* | 1/2018 | Loan | G09B 9/00 |
| 2019/0029633 | A1* | 1/2019 | Broggio | G09B 23/30 |
| 2020/0211419 | A1* | 7/2020 | Hiyama | G09B 23/28 |
| 2020/0349864 | A1* | 11/2020 | Hanna | G09B 23/303 |
| 2021/0020070 | A1* | 1/2021 | Williams | G09B 23/34 |

* cited by examiner

WOUND BOX TRAINER

REFERENCE TO RELATED APPLICATIONS

This application is a continuation of co-pending U.S. Non-Provisional application Ser. No. 18/111,629 filed Feb. 20, 2023 entitled Wound Box Trainer, which is a continuation of U.S. Non-Provisional application Ser. No. 17/517,017 filed Nov. 2, 2021 entitled Wound Box Trainer now U.S. Pat. No. 11,631,343, which is a continuation of U.S. Non-Provisional application Ser. No. 16/806,595 filed Mar. 2, 2020 entitled Wound Box Trainer now U.S. Pat. No. 11,195,435, which is a continuation of U.S. Non-Provisional application Ser. No. 16/806,219 filed Mar. 2, 2020 entitled Wound Box Trainer now U.S. Pat. No. 11,195,434, which is a continuation-in-part of U.S. Non-Provisional application Ser. No. 16/429,202 filed Jun. 3, 2019 entitled Wound Box Trainer now U.S. Pat. No. 10,586,470, which is a continuation of U.S. Non-Provisional application Ser. No. 16/244,735 filed Jan. 10, 2019 entitled Wound Box Trainer now U.S. Pat. No. 10,535,282, which is a continuation-in-part of U.S. Non-Provisional application Ser. No. 15/144,007 filed May 2, 2016 entitled Wound Box Trainer now U.S. Pat. No. 10,217,380. All prior applications incorporated in their entirety by reference thereto.

FEDERALLY SPONSORED RESEARCH AND DEVELOPMENT

None.

FIELD OF THE INVENTION

The invention generally relates to a device for medical training purposes. Specifically, the invention comprises a simulant with an optional case adapted to receive the simulant whereby the simulant approximates portion of a body, human or animal, with or without a wound structure and whereby the simulant permits a user to practice a task-specific medical procedure.

BACKGROUND OF THE INVENTION

Mannequins and wearable simulants are commonly employed to train civilian and military non-medical personnel as to the proper treatment of penetrating and non-penetrating injuries. The purpose of such training is to instill the skills required to stabilize the medical condition of a patient before and during transport to a medical facility.

Mannequins and wearable simulants replicate the appearance and tactile properties of flesh, tissues, bones and organs, as well as penetrating and non-penetrating injuries thereto. Training devices often include tubes which allow a liquid simulating blood to flow to and out of an injury. The combination of visual, tactile, and functional properties ensures a more realistic representation of an injured body. However, mannequins and wearable simulants are costly and often include features and details that improve the overall realism of a training experience but otherwise not required for task-specific training purposes.

Accordingly, what is required is a low-cost, modular device including a simulant with or without a protective case whereby the simulant permits practice of a task-specific medical procedure required to either directly or indirectly treat a wound.

SUMMARY OF THE INVENTION

Accordingly, what is required is a low-cost, modular device including a simulant with or without a protective case whereby the simulant permits practice of a task-specific medical procedure required to either directly or indirectly treat a wound.

In accordance with embodiments of the invention, the wound trainer includes a compressible body, a wound structure, and an annular cavity. The compressible body simulates portion of a body. The compressible body includes a top surface. The wound structure is disposed along the compressible body. The wound structure includes a wound cavity which extends from into the compressible body from the top surface. The annular cavity extends into the compressible body about the wound cavity. The annular cavity permits in use at least one of movement or expansion of a wall defined by and disposed between the wound cavity and the annular cavity.

In accordance with other embodiments, the compressible body includes a surface layer and a subsurface layer.

In accordance with other embodiments, the compressible body includes a surface layer which is pigmented.

In accordance with other embodiments, the annular cavity and the wound cavity partially overlap.

In accordance with other embodiments, a surface feature is disposed about the wound cavity along the top surface and the surface feature simulates a damaged tissue.

In accordance with other embodiments, the annular cavity extends into the compressible body from a bottom surface of the compressible body.

In accordance with other embodiments, an insert is disposed within the annular cavity adjacent to the bottom surface.

In accordance with other embodiments, a bleed tube communicates at one end with the wound cavity.

In accordance with other embodiments, the bleed tube is disposed within a channel along the compressible body.

In accordance with other embodiments, the compressible body includes at least one runner which traverses the annular cavity.

Advantages of the invention include but are not limited to the following. In some embodiments, the invention permits a user to directly treat a wound whereby the user practices a task-specific medical procedure by way of a region with a simulated wound. In other embodiments, the invention permits a user to indirectly treat a wound whereby the user practices a task-specific medical procedure by way of a region separate from a wound.

The above and other objectives, features, and advantages of the preferred and other embodiments of the invention will become apparent from the following description read in connection with the accompanying drawings, in which like reference numerals designate the same or similar elements.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION

Figure 1:
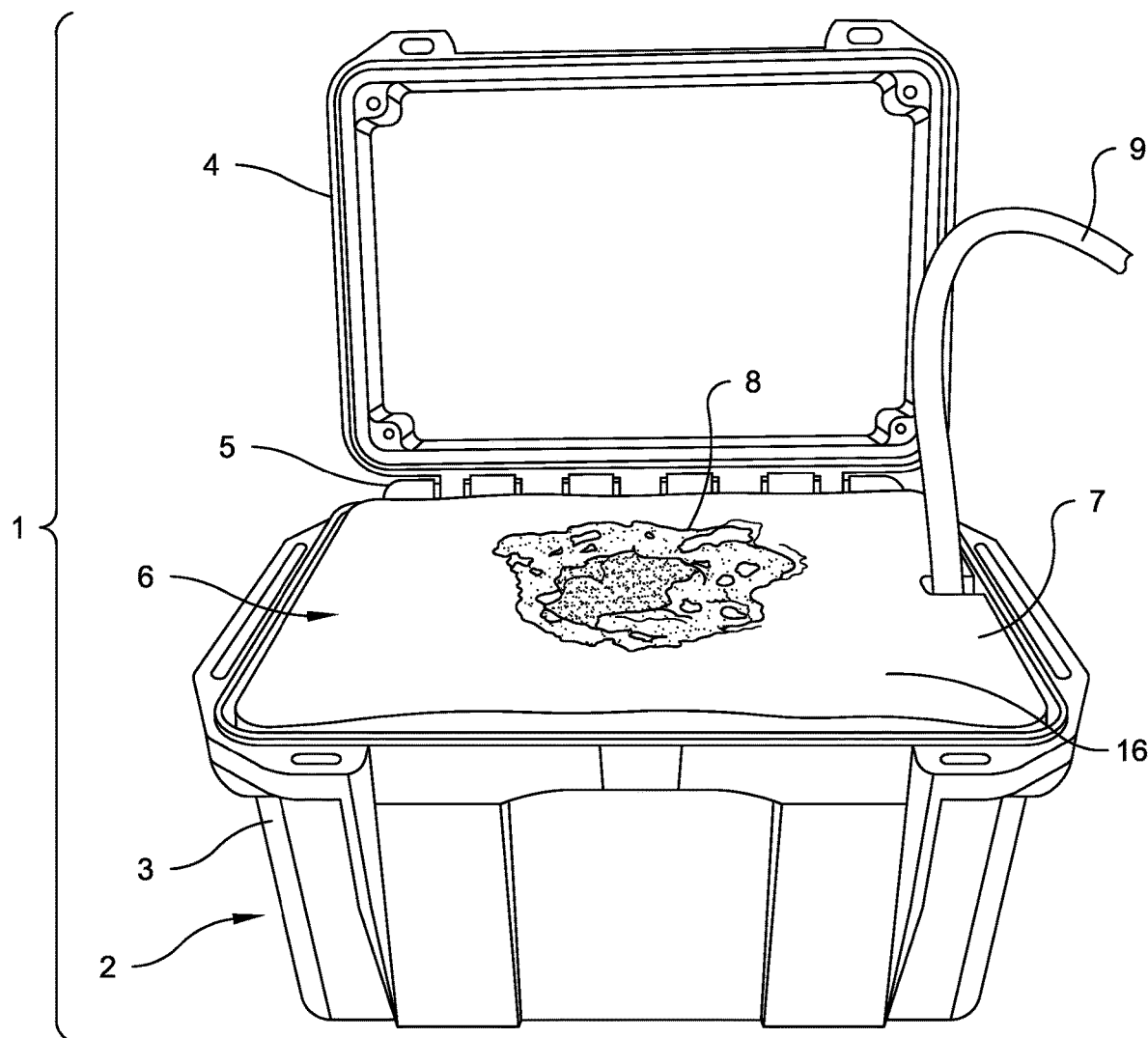
FIG. 1 is a front-side perspective view illustrating a wound box trainer including a simulant disposed within a base portion of an optional case with a closable lid attached thereto and a wound structure disposed along the simulant with an optional tube in accordance with an embodiment of the invention.

Reference will now be made in detail to several embodiments of the invention that are illustrated in the accompanying drawings. Wherever possible, same or similar reference numerals are used in the drawings and the description to refer to the same or like parts. The drawings are in simplified form and are not necessarily to precise scale.

While features of various embodiments are separately described throughout this document, it is understood that two or more such features could be combined to form other embodiments.

Furthermore, it is understood that one or more features, components, and/or elements of the simulants 6 in FIGS. 1-8, FIGS. 9-15, and/or FIGS. 16-20 are combinable to form a single simulant 6 whereby the features, components, and/or elements reside within and/or on a single compressible body 7 or 25.

The simulants and components thereof or thereto described herein may be fabricated via cast or other methods understood in the art.

Referring now to FIG. 1, the wound box trainer 1 generally includes a simulant 6 disposed within a case 2. The simulant 6 further includes a compressible body 7, a wound structure 8 disposed along the compressible body 7, and an optional bleed tube 9 extendable from the case 2.

Referring again to FIG. 1, the case 2 may further include a base 3 and a lid 4. The base 3 and lid 4 may be composed of materials suitable for a case 2, examples including, but not limited to, plastics and metals. The base 3 and lid 4 generally define a cavity of sufficient volume to hold and support the simulant 6. A hinge 5 may be attached to the base 3 and lid 4 so as to allow the lid 4 to be openable and closable with respect to the base 3. It is likewise possible for other connecting means understood in the art to allow the lid 4 to be attachable to and detachable from the base 3 so that the lid 4 is combinable with and separable from the base 3. Regardless of the means employed to open and close the case 2, the base 3 and the lid 4 should permit access to and use of the simulant 6 in an open configuration. The interface between base 3 and lid 4 may limit or prevent infiltration of a gas and/or a liquid into the case 2 in a closed configuration. Handle and locking mechanisms (not shown) may be included in some embodiments.

While it is understood that various designs are possible for the case 2, the purpose of the case 2 is to facilitate storage of a simulant 6 when not in use, transport of a simulant 6 to and from a training session, and use of a simulant 6 during a training session. The base 3 is harder and therefore less prone to damage than the compressible body 7. The base 3 with or without the lid 4 should protectively cover portions of the simulant 6 so as to prevent damage to and/or impairment of the simulant 6. The depth of the simulant 6 may allow the top surface 16 along the compressible body 7 to extend above, to reside below, or to align approximately with the top of the base 3, the latter being a preferred embodiment as illustrated in FIG. 1. A non-limiting exemplary case 2 is the UltraBox™ sold by Underwater Kinetics located in Poway, California.

Figure 2:
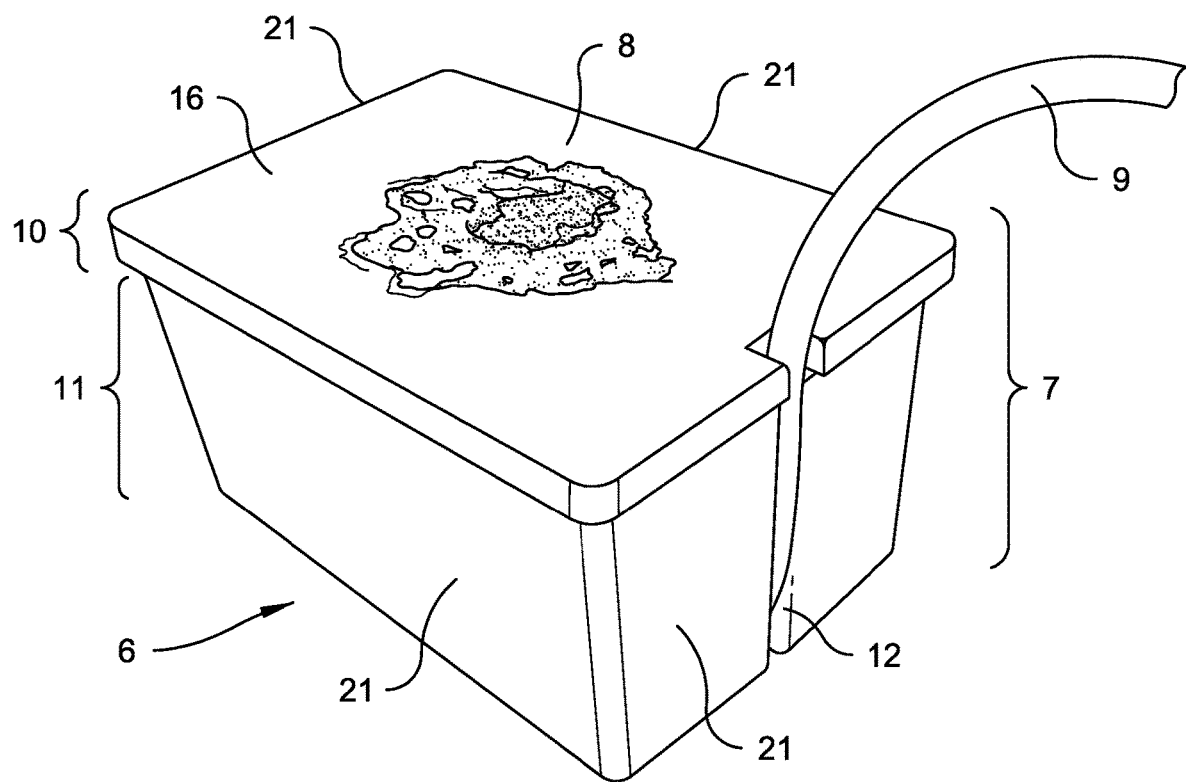
FIG. 2 is a top-side perspective view illustrating a simulant including a compressible body with a surface layer and a subsurface layer and a wound structure disposed along the simulant with an optional tube traversing a channel along the compressible body in accordance with an embodiment of the invention.
Figure 3:
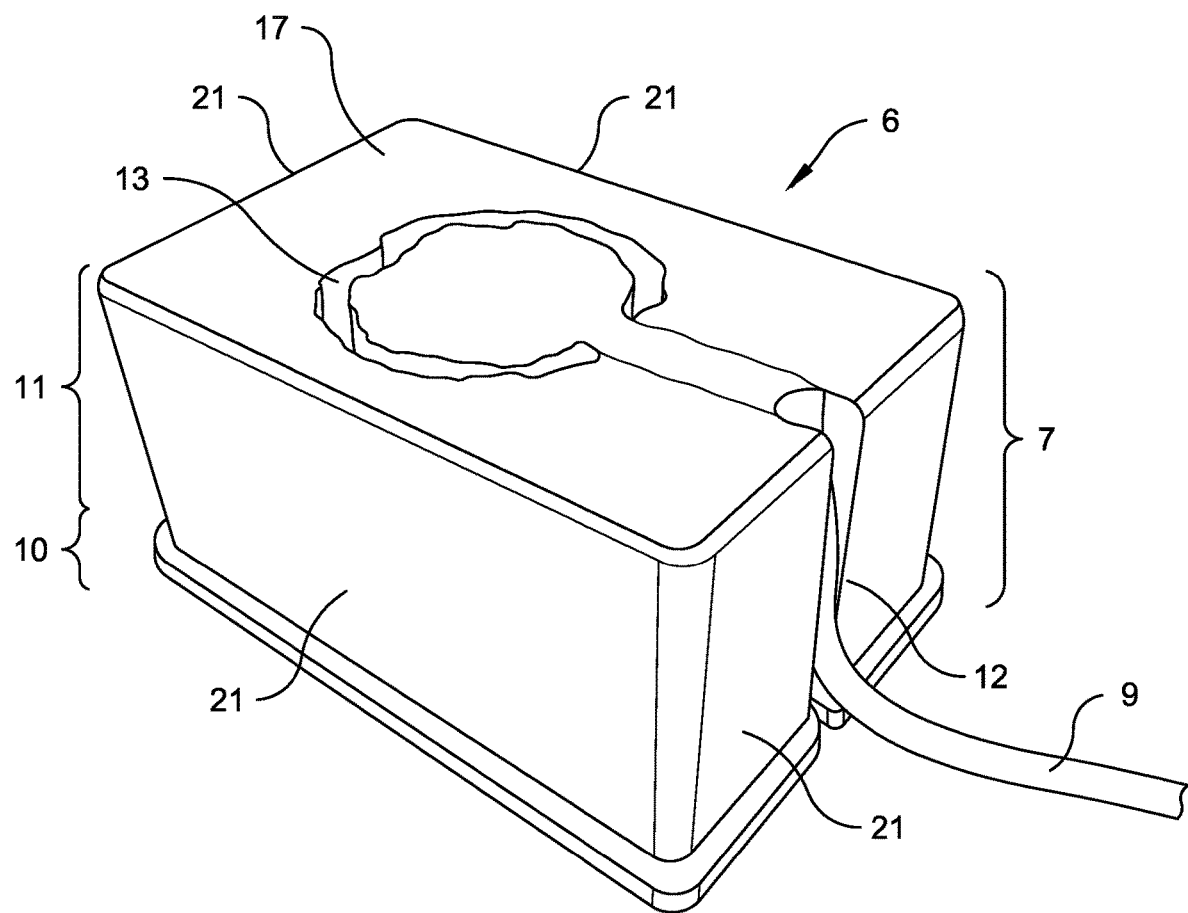
FIG. 3 is a bottom-side perspective view illustrating a simulant including a compressible body with an optional bleed tube traversing a channel along the side and the top of the compressible body and an annular channel extending into the compressible body in accordance with an embodiment of the invention.

Referring now to FIGS. 2 and 3, the simulant 6 is comprised of a compressible body 7 with a wound structure 8 thereon, preferably at the top surface 16. The compressible body 7 may be composed of one or more layers of one or more polymer materials, one non-limiting example being silicone. The compressible body 7 should deform when a force is applied thereto, yet be sufficiently resilient to recover its original shape after the force is removed. In preferred embodiments, the compressible body 7 further includes a surface layer 10 and a subsurface layer 11. It is likewise possible for the surface layer 10 and the subsurface layer 11 to each be composed of one or more layers of one or more polymer materials. In one example, the surface layer 10 could include one or more layers with pigmentation, as described in U.S. Pat. No. 8,221,129 entitled Wearable Wound Simulant which is incorporated in its entirety by reference thereto, and the subsurface layer 11 could be a single cold-cast resin without pigmentation. In some embodiments, a bone simulant (not shown) or the like could be partially or completely embedded within the compressible body 7. The compressible body 7 is shaped and dimensioned to permit assembly into and with the base 3 whereby the sides 21 and the bottom surface 17 contact corresponding surfaces along the interior of the base 3.

Referring again to FIGS. 2 and 3, the compressible body 7 may include a channel 12 disposed along one side 21 and the bottom surface 17. The channel 12 may be formed via either cast or machining techniques. The channel 12 should be sufficiently wide and deep so that a bleed tube 9 is recessed within the compressible body 7 when the bleed tube 9 contacts the channel 12. An annular cavity 13 is either cast or machined into the compressible body 7 so as to extend into the compressible body 7 from the bottom surface 17.

Figure 4:
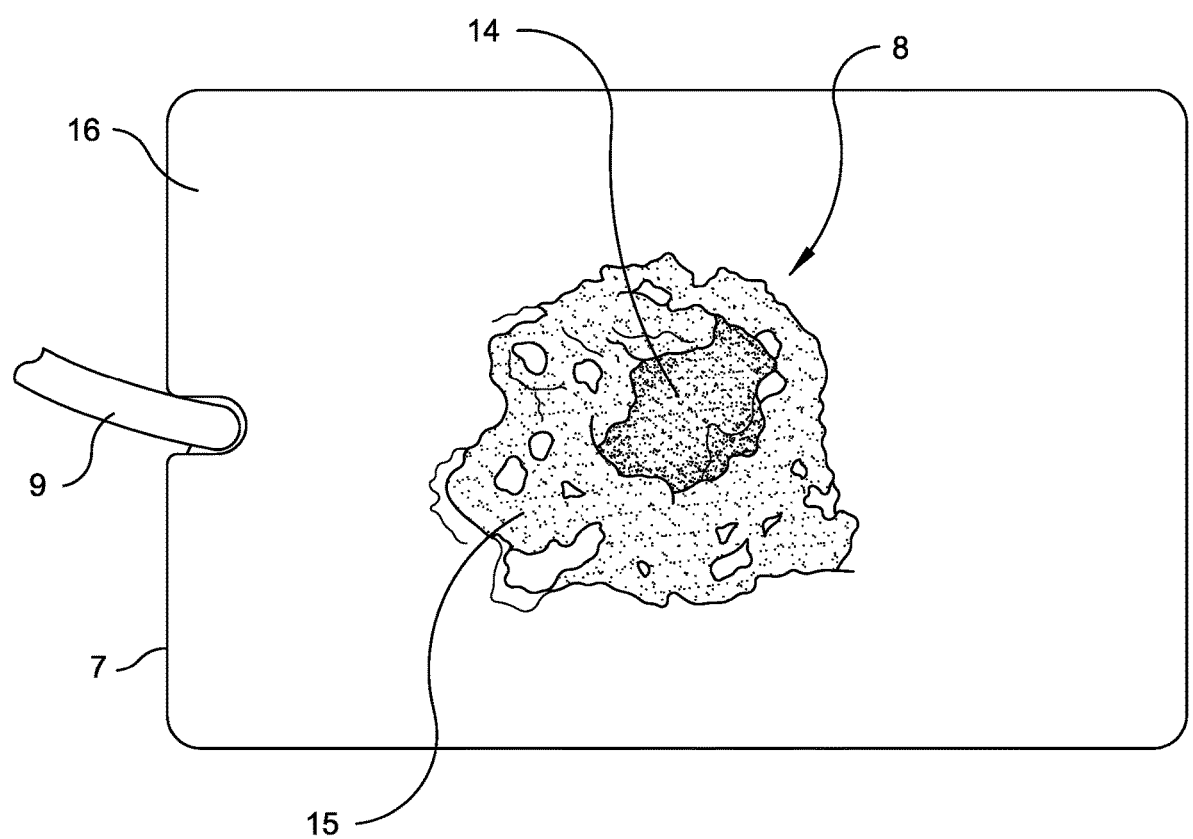
FIG. 4 is a top-side view illustrating a compressible body with a wound structure including a wound cavity extending into the compressible body and an optional surface feature about the cavity with an optional bleed tube at one side of the compressible body in accordance with an embodiment of the invention.
Figure 5:
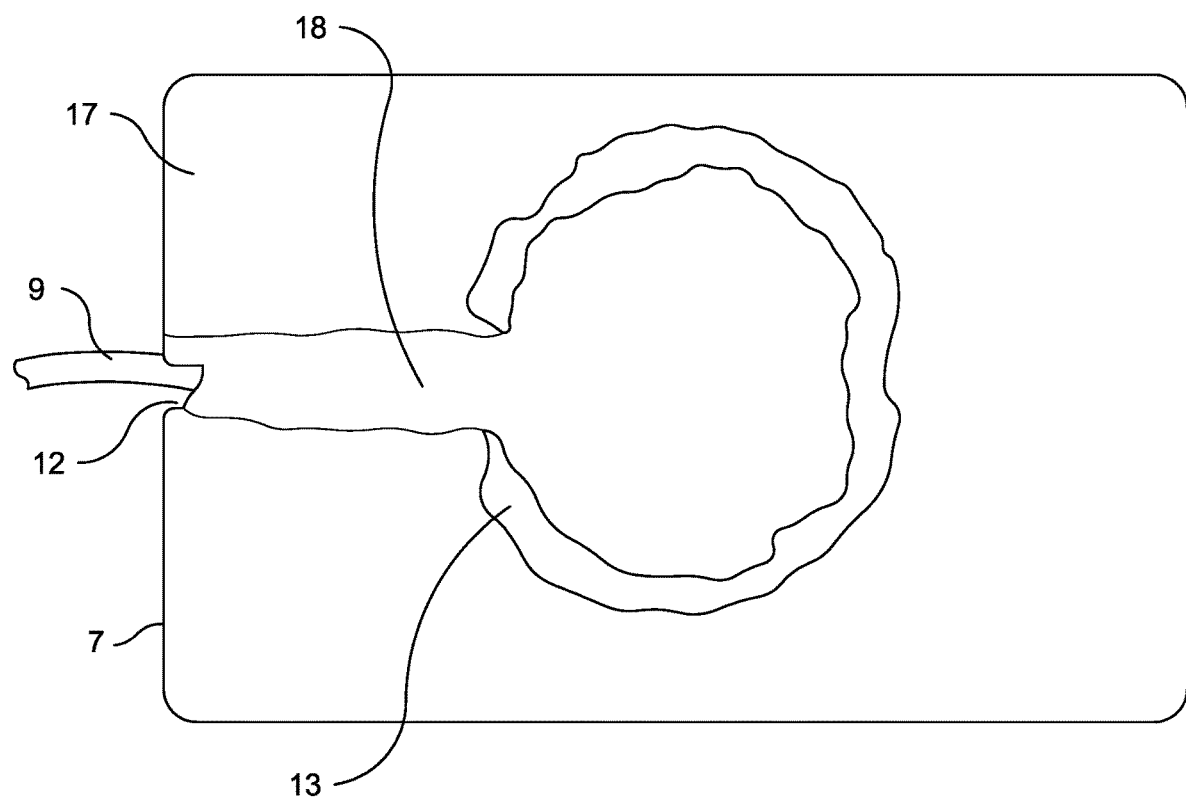
FIG. 5 is a bottom-side view illustrating an annular cavity extending into a compressible body about a wound cavity (not shown) and an optional bleed tube communicating with the wound cavity in accordance with an embodiment of the invention.

Referring now to FIGS. 4 and 5, a wound structure 8 and an annular cavity 13 are provided along the compressible body 7. The wound structure 8 further includes a wound cavity 14 that extends into the compressible body 7 from the top surface 16 in the direction of the bottom surface 17. In some embodiments, it might be advantageous to include a surface feature 15 disposed about the wound cavity 14. The surface feature 15 may include textures, coloring, and other features and elements that simulate damaged flesh, tissues, bones, and the like about a wound cavity 14. The annular cavity 13 extends from the bottom surface 17 into the compressible body 7 in the direction of the top surface 16. The annular cavity 13 is positioned circumferentially about the wound cavity 14.

Referring again to FIGS. 4 and 5, the bleed tube 9 may traverse a channel 12 along a portion of the bottom surface 17. One end of the bleed tube 9 communicates with the wound cavity 14. The bleed tube 9 may be secured to the compressible body 7 via an outer layer 18. The outer layer 18 may be composed of a layer of silicone adhesive or other cold curable resin.

Figure 6:
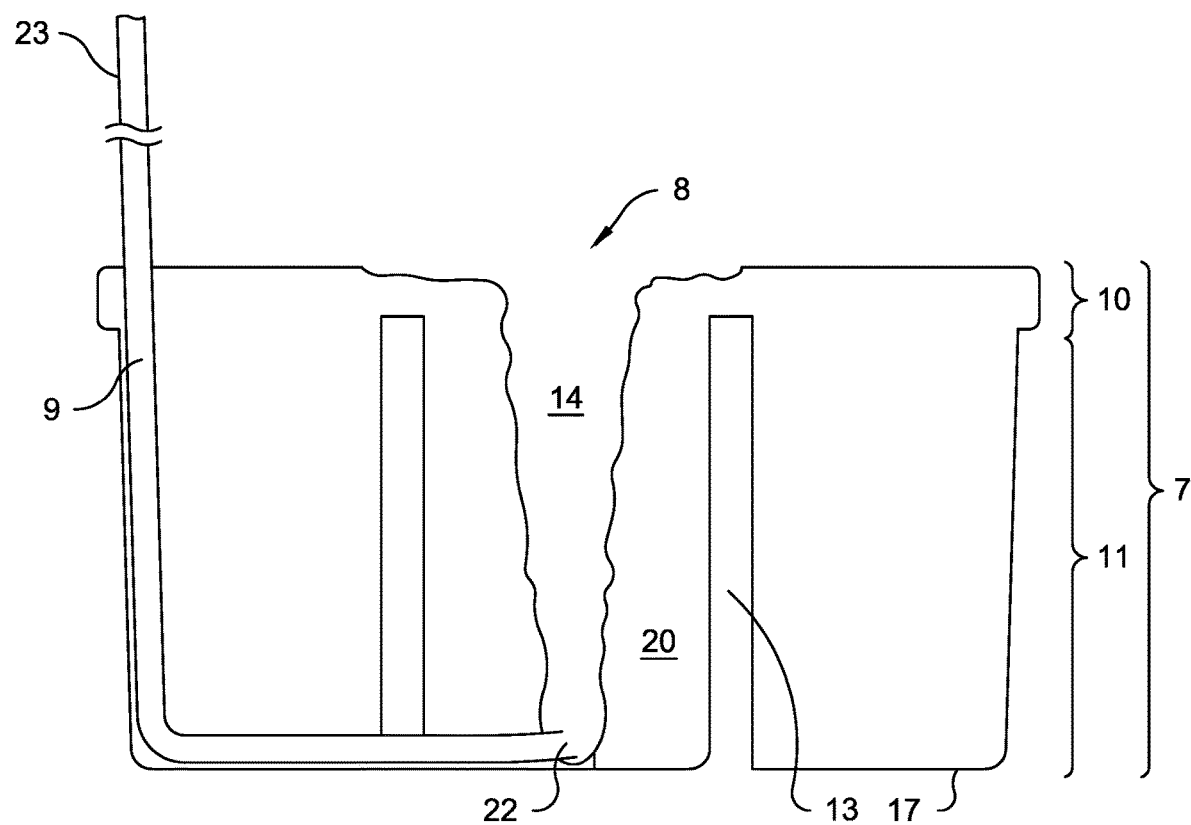
FIG. 6 is cross-section view illustrating a bleed tube disposed along a channel traversing the side and the bottom of a compressible body and an annular cavity extending into the compressible body about a wound cavity in accordance with an embodiment of the invention.

Referring now to FIG. 6, the wound cavity 14 and the annular cavity 13 are arranged so as to at least partially overlap within the compressible body 7. This arrangement places the annular cavity 13 about the wound cavity 14. In some embodiments, the wound cavity 14 may extend into the compressible body 7 so as to only partially traverse the surface layer 10. In other embodiments, the wound cavity 14 may extend into the compressible body 7 so as to completely traverse the surface layer 10 and partially traverse the subsurface layer 11. In yet other embodiments, the wound cavity 14 may extend into the compressible body 7 so as to completely traverse the surface layer 10 and the subsurface layer 11.

Referring again to FIG. 6, the annular cavity 13 may extend into the compressible body 7 so as to only partially or completely traverse the subsurface layer 11 with or without extension into the surface layer 10. While the wound cavity 14 may completely traverse the depth of the compressible body 7, it is preferred that the annular cavity 13 only partially traverse the depth of the compressible body 7. However, it is understood that it might be advantageous in some embodiments for the wound cavity 14 and the annular cavity 13 to completely traverse the depth of the compressible body 7.

Referring again to FIG. 6, the downstream end 22 of the bleed tube 9 resides within the wound box trainer 1 and extends to the wound cavity 14. This arrangement allows communication of a blood simulant from the bleed tube 9 into the wound cavity 14. The bleed tube 9 may be composed of a silicone-based resin or other material suitable for use with a blood simulant. The upstream end 23 of the bleed tube 9 may communicate with a pump (not shown) or the like to ensure continuous flow of a blood simulant into the wound cavity 14. The pump could reside within or external to the wound box trainer 1. In preferred embodiments, the fluid pressures produced by the pump should approximate the pressures of blood within and flowing from a vascular element. This feature ensures a more realistic interaction between a blood simulant exiting the bleed tube 9 and packing materials and probes within the wound cavity 14.

The treatment of a wound typically requires both probing and packing. Probing is the process whereby a finger or an instrument is inserted into a wound cavity 14 so as to identify and remove projectile fragments and the like and to identify the source(s) of bleeds. Packing is the process whereby gauze and other materials are inserted into a wound cavity 14 so as to reduce or stem blood flow from a compromised vascular element. The present invention facilitates a realistic response by a wound structure 8 to both probing and packing by permitting movement and/or expansion of the compressible body 7 immediately adjacent to a wound cavity 14.

Referring again to FIG. 6, the wound cavity 14 and the annular cavity 13 are separated by a wall 20 comprised of a portion of the compressible body 7 between the wound cavity 14 and the annular cavity 13. The wall 20 generally defines a pocket-like structure within the simulant 6 which extends into the compressible body 7 in the direction of the bottom surface 17. While the sides of the wall 20 do not initially contact other portions of the compressible body 7 because of the annular cavity 13, the top end of the wall 20 contacts and is attached to other portions of the compressible body 7.

The wall 20 may be readily movable when probed and/or packed. This functionality permits the wall 20 to translate or rotate so that the width of the annular cavity 13 decreases in the direction of a force applied onto the wall 20 from within the wound cavity 14. This response type is typically associated with no or limited thinning of the wall 20 immediately adjacent to the movement. Preferred embodiments require the wall 20 to return and recover to its original position after a deforming force is removed.

The wall 20 may be readily expandable and contractible when probed and/or packed. This functionality permits the wall 20 to expand radially outward so that the width of the annular cavity 13 circumferentially decreases in the direct of a force applied onto the wall 20 from within the wound cavity 14. This response is typically associated with thinning of the wall 20 immediately adjacent to the expansion. The wall 20 may also contract radially inward so that the width of the annular cavity 13 circumferentially increases when a force is removed from the wall 20 within the wound cavity 14. This response is typically associated with thickening of the wall 20 immediately adjacent to the contraction. Preferred embodiments require the wall 20 to return and recover its original shape after a deforming force is removed.

In some embodiments, the wall 20 may only permit movement. In other embodiments, the wall 20 may only permit expansion. In yet other embodiments, movement and expansion may be permissible. The degree to which movement and/or expansion occurs is determined in part by the thickness of the wall 20, the width of the annular cavity 13, the material(s) comprising the compressible body 7, and the forces applied to the wall 20 during probing and packing.

It is understood that the movement and/or expansion permitted by the wall 20 approximates compression of flesh, tissues, and organs adjacent to a wound cavity 14 thereby simulating movement and expansion of the interior sides along a wound cavity 14. The annular cavity 13 minimizes resistance to compression by the compressible body 7 when probed and packed by permitting a region whereby movement and/or expansion by the wall 20 occurs without initially contacting other portions of the compressible body 7 immediately adjacent to the translating or rotating portion of the wall 20. This resistance is associated with the confinement effects imposed by contact between the base 3 and the sides 21 and the bottom surface 17 along the compressible body 7.

Figure 7A:
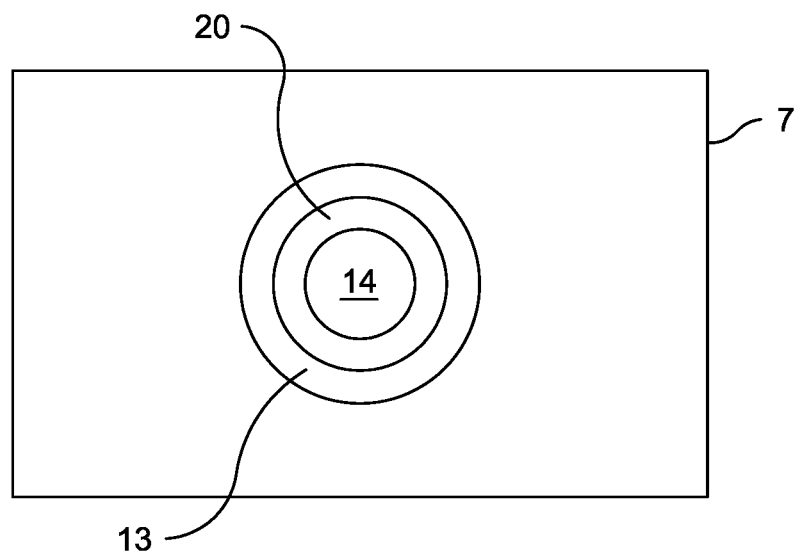
FIG. 7a is a cross-section view illustrating an annular cavity circumferentially disposed about a wound cavity without runners in accordance with an embodiment of the invention.
Figure 7B:
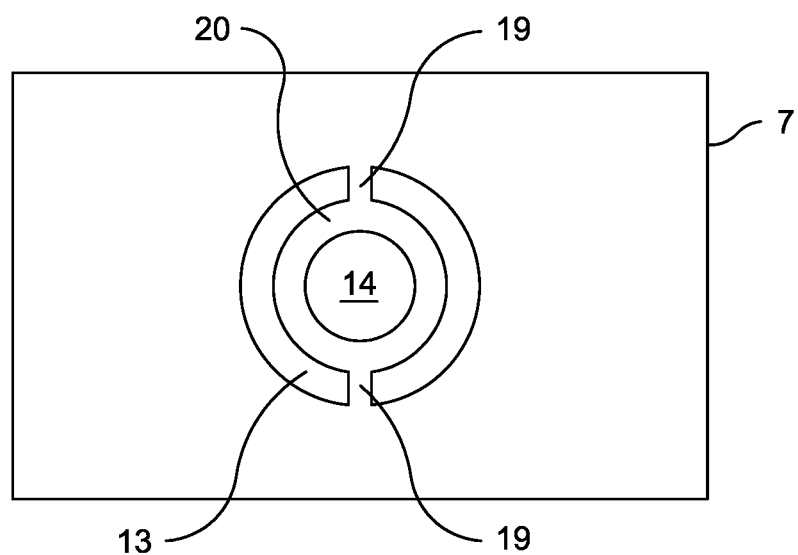
FIG. 7b is a cross-section view illustrating an annular cavity circumferentially disposed about a wound cavity with runners in accordance with an embodiment of the invention.

Referring now to FIGS. 7a and 7b, the wall 20 is composed of a portion of the compressible body 7 and generally defined by and positioned between the annular cavity 13 and the wound cavity 14. The wall 20 should be sufficiently thick so as to prevent punctures or tears that could otherwise compromise the ability of the wound cavity 14 to fill with and hold a blood simulant entering via the bleed tube 9. In some embodiments, the annular cavity 13 should completely encircle the side of the wall 20 thereby separating it from other portions of the compressible body 7 as represent in FIG. 7a. In other embodiments, the side of the wall 20 could be partially secured to a portion of the compressible body 7 via one or more runners 19 as represented in FIG. 7b. The runner 19 could be a web-like element that traverses a portion of the depth of the compressible body 7 so as to provide lateral support to the wall 20 along a portion of the circumference of the wound cavity 14. The runner(s) 19 may induce asymmetries in the movement and expansion of the wall 20 as might be imposed by flesh, tissues, bones, and the like adjacent to the wound cavity 14.

Referring again to FIGS. 1 and 6, the wound box trainer 1 is opened by separating the lid 4 from the base 3. If a hinge 5 is provided between the lid 4 and base 3, then the lid 4 is rotated up and away from the base 4. Separation of the lid 4 from the base 3 exposes the simulant 6 so that the top surface 16 is clearly visible and the wound structure 8 and bleed tube 9 are accessible. The bleed tube 9 is removed from the case 2 and extended therefrom for attachment to a pump (not shown) communicable with a reservoir or the like containing a blood simulant. The pump may be manually operable or motorized. Once engaged and powered, the pump communicates the blood simulant into the bleed tube 9. The bleed tube 9 communicates the blood simulant into the wound cavity 14 at the location wherein the bleed tube 9 enters the wound cavity 14.

In some embodiments, the wound box trainer 1 is useful as an instructional tool to demonstrate treatment techniques required to properly limit or stem blood loss from a wound structure 8 caused by a compromised vascular element. The compromised vascular element is simulated by the bleed tube 9. The wound box trainer 1 permits the trainee to practice various treatment techniques via probing and packing of the wound structure 8.

In yet other embodiments, the wound box trainer 1 may include one or more wound types, examples including but not limited to, a wound structure 8 with or without a wound cavity 14 associated with a penetration-induced injury or a wound structure 8 associated with a blast-induced injury. Exemplary penetration-induced injuries include, but are not limited to, a wound cavity 14 produced by a bullet, a fragment, a projectile, a cutting instrument, or the like. Exemplary blast-induced injuries include, but are not limited to, a wound cavity 14 produced by explosive pressures that either directly or indirectly deform, penetrate, or tear flesh, tissues, and/or organs.

Figure 8:
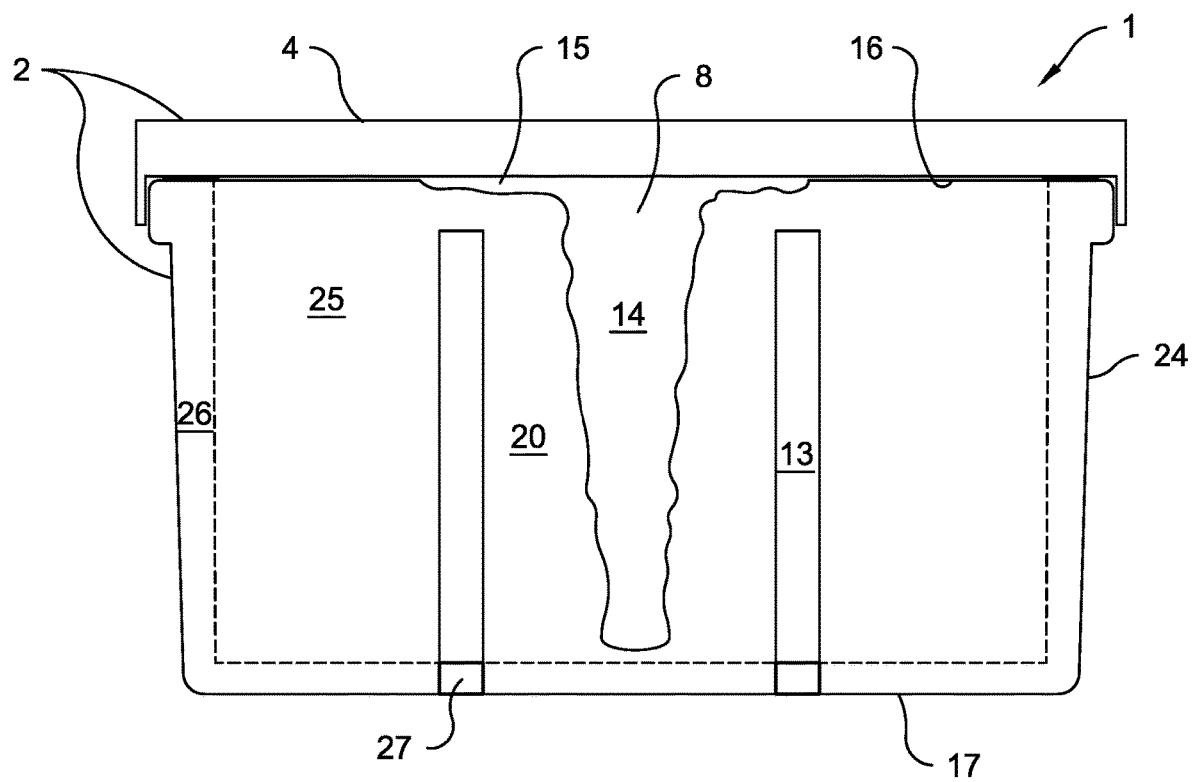
FIG. 8 is a cross-section view illustrating a wound box trainer with optional lid wherein a base is disposed about and integral to a compressible body so that both the base and the compressible body form a composite body in accordance with an embodiment of the invention.

Referring now to FIG. 8, the wound box trainer 1 may include a base 26 which is integral to and an extension of the compressible body 25. In this embodiment, the base 26 and the compressible body 25 are inseparable thereby forming a unitary body 24. Furthermore, the base 26 is more resistant to damage than the compressible body 25 so as to form a protective cover about the compressible body 25.

The unitary body 24 may be fabricated from one or more resins or the like, preferably castable, which form a base 26 providing a shell-like protective covering along the sides and the bottom of the otherwise elastically-deformable compressible body 25. When two or more resins are required to properly form the base 26 and the compressible body 25, the resins may be jointly or separately poured and cured.

The protective shell-like structure forming the base 26 is the functional equivalent of the base 3 described herein. In preferred embodiments, the base 26 is harder and therefore less prone to damage than the compressible body 25. In some embodiments, hardness may gradually decrease with depth in the direction of the compressible body 25 so that the transition between the base 26 and the compressible body 25 is less distinct than the dashed line illustrated in FIG. 8. In other embodiments, hardness may abruptly change at a particularly depth or over a narrow range of depths so that the transition between the base 26 and the compressible body 25 is more distinct as suggested by the dashed line in FIG. 8. Regardless, it is understood that the compressible body 25 and the base 26 form a unitary body 24 whereby the base 26 is disposed about the sides and the bottom of the compressible body 25 and whereby the compressible body 25 and the base 26 are not separable without damage to one or both components. It is further understood that the base 26 should form a protective covering about the compressible body 25 without compromising the compressibility of the compressible body 25.

Referring again to FIG. 8, the wound structure 8 is disposed along the compressible body 25 so that a wound cavity 14 as described herein extends into the compressible body 25 from a top surface 16. The wound cavity 14 may include an optional surface feature 15 as also described herein. The wound cavity 14 and the surface feature 15 may be fabricated via forming, machining, or other means understood in the art.

Referring again to FIG. 8, the annular cavity 13 as described herein extends into the compressible body 25 about the wound cavity 14. This arrangement allows at least a portion of the annular cavity 13 to reside next to and thereby overlap the wound cavity 14. In preferred embodiments, the annular cavity 13 extends into the compressible body 25 from the bottom surface 17 whereby the bottom surface 17 corresponds to the outer surface of the base 26 at the bottom side of the wound box trainer 1. A bleed tube 9 (not shown) may communicate with the wound cavity 14 as described herein. Furthermore, a channel 12 (not shown) configured as described herein to accept the bleed tube 9 may be disposed along a portion of the base 26 and/or the compressible body 25.

Referring again to FIG. 8, an insert 27 may be secured within the annular cavity 13 adjacent to the bottom surface 17. The insert 27 could be secured to the compressible body 25 by such non-limiting examples as an interference fit or an adhesive. The insert 27 is located within the annular cavity 13 so as to prevent material from entering the annular cavity 13 which might otherwise degrade or impede motion by or expansion of the wall 20 during use. In preferred embodiments, the insert 27 is positioned within the annular cavity 13 adjacent to the bottom surface 17.

In some embodiments, the insert 27 may be formed of a resin(s) comprising the base 26 and/or compressible body 26. The insert 27 may be formed separate from the unitary body 24 and then inserted into the annular cavity 13. The insert 27 may also be directly formed onto the unitary body 24 at the lower end of the annular cavity 13.

Referring again to FIG. 8, an optional lid 4 may be removably attachable to the unitary body 24 adjacent to the top surface 16. Features of the lid 4 and the base 26 may cooperate so that the lid 4 is mechanically securable to the unitary body 24 so as to conceal the top surface 16. The combination of the lid 4 and the base 26 may form a case 2 which is functionally equivalent of the lid 4 and the base 3 described herein. However, it is understood that various forms of the case 2 described herein may not require a lid 4 when the base 26 alone sufficiently protects the compressible body 25.

Referring now to FIGS. 9-15, the wound box trainer 1 may be configured with a simulant 6 which approximates a neck with or without a chin portion to facilitate practice of a task-specific procedure for establishing an emergency airway. In one non-limiting example, the emergency airway may be formed by way of a cricothyrotomy procedure wherein an opening is cut through the neck and into a trachea and a tube or a needle is inserted into the trachea via the opening. This form of the wound box trainer 1 permits a user to create a wound required for treatment of another wound either simulated or not simulated by the simulant 6. In one example, the wound is the opening along the neck and the trachea formed by a user of the wound box trainer 1 and the other wound is an injury which impedes airflow into a trachea. The other wound may be simulated as described herein by way of the non-limiting examples of the wound structure 8 with or without the annular cavity 13 in FIGS. 1-8. Approximate may include at least one of feature, appearance, shape, color, dimension(s), location, texture, feel, mechanical resistance, pop sound, pop sensation, deformability, resiliency, or rigidity.

Figure 9:
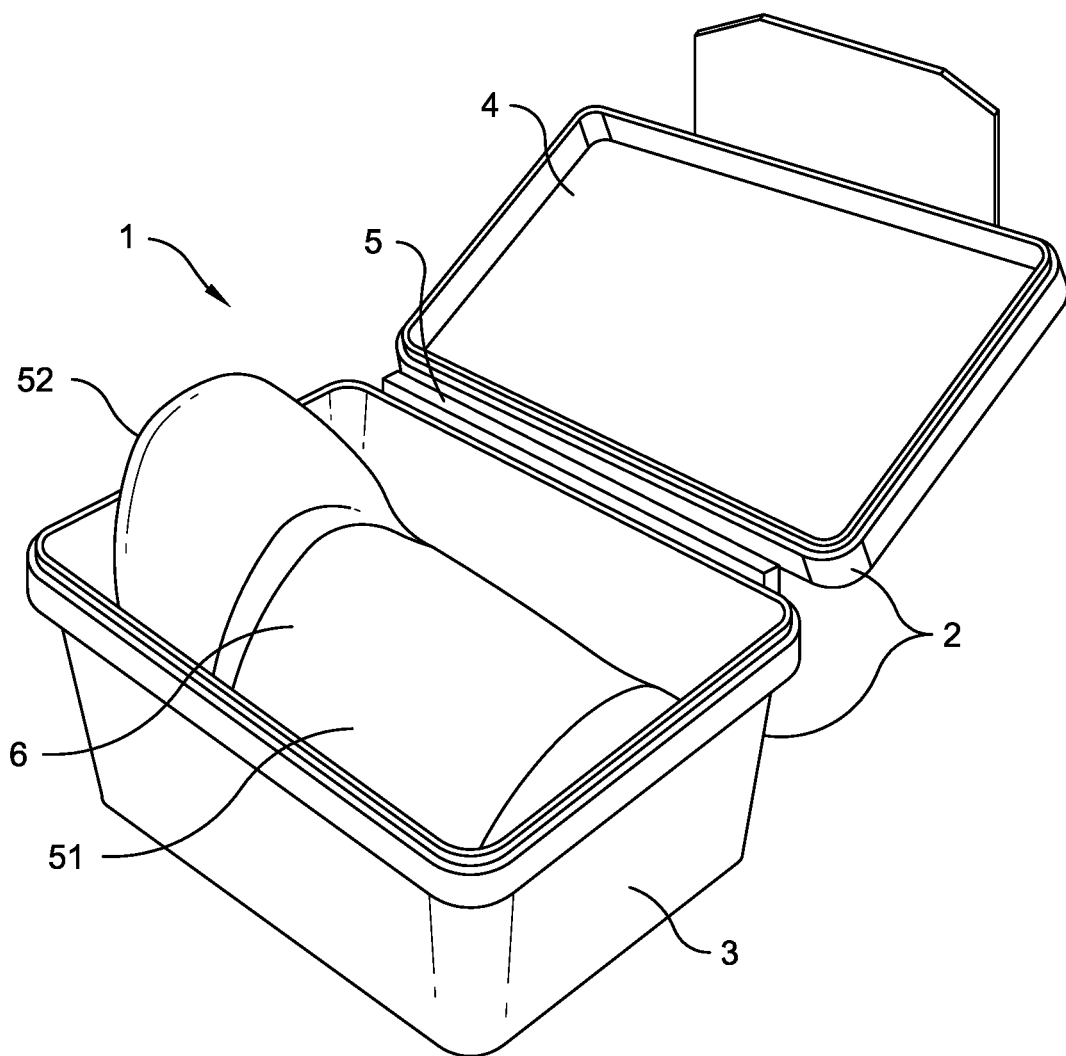
FIG. 9 is a top-side perspective view illustrating a wound box trainer including a simulant disposed within an optional case with an optional base and an optional lid wherein the simulant approximates the appearance of a neck region with optional chin portion for use with training specific to establishing an emergency airway in accordance with an embodiment of the invention.

Referring now to FIG. 9, the wound box trainer 1 may include a simulant 6 shaped to approximate at least the front side of a neck 51. The simulant 6 may generally include the curved and elongated features of a neck 51. In some embodiments, it may be beneficial to include a portion that extends from one end of the curved and elongated section to approximate the appearance of a chin 52. The simulant 6 may reside within an optional case 2 including an optional base 3 with or without an optional lid 4. The lid 4 may be secured to the base 3 via an optional hinge 5. The case 2 may surround the simulant 6 in part or whole when the wound box trainer 1 is not in use.

Figure 10:
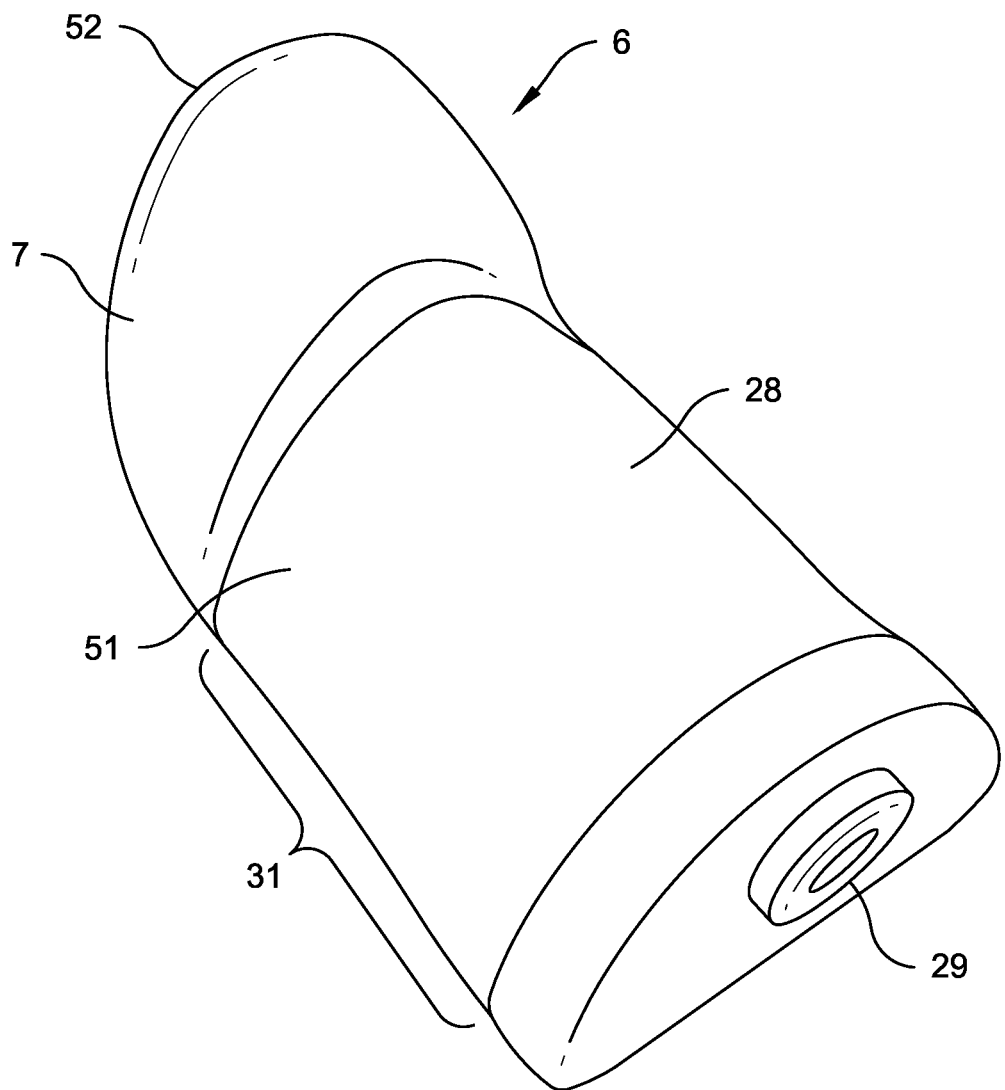
FIG. 10 is a top-side perspective view illustrating a simulant wherein a compressible body and an outer covering approximate the appearance of a neck, the outer covering is disposed along the compressible body within a recess, and an insert partially extends from the compressible body in accordance with an embodiment of the invention.

Referring now to FIG. 10, the simulant 6 includes a compressible body 7 and an outer covering 28 which cooperate to approximate the external appearance of a neck 51 in part or whole. The compressible body 7 may or may not include features approximating appearance of a chin 52. The compressible body 7 may include a recess 31, preferably along the neck 51. The recess 31 is shaped and sized to receive the outer covering 28. The compressible body 7 within the recess 31 may be pigmented and/or textured to approximate the appearance of subsurface tissues. In preferred embodiments, the outer covering 28 is mounted along the compressible body 7 within the recess 31 so that the outer surfaces of both the outer covering 28 and the compressible body 7 adjacent to the recess 31 are flush. This feature may conceal the seam in part or whole between the outer covering 28 and the compressible body 7 for appearance purposes.

Referring again to FIG. 10, the outer covering 28 is positioned along the compressible body 7 so as to overlay an insert 29 which extends into the compressible body 7, the latter feature not shown. The outer covering 28 permits a user to penetrate, one non-limiting example being cut, into the simulant 6 when establishing an emergency airway without damage to the compressible body 7. This feature is beneficial in that the outer covering 28 rather than the compressible body 7 is replaced after one or more training sessions. The outer covering 28 may be secured to the compressible body 7 via an adhesive, a hook-n-look fastener, or other suitable non-mechanical or mechanical means understood in the art. Regardless of the attachment approach, it is understood that the outer covering 28 should be separable from the compressible body 7 to facilitate replacement after being penetrated.

Referring again to FIG. 10, the compressible body 7 and the outer covering 28 may include one or more layers of one or more polymer materials, one non-limiting example of the latter being a cold-castable resin such as silicone. The compressible body 7 and the outer covering 28 should deform when a force is applied thereto, yet be sufficiently resilient to recover an original shape in part or whole after a force is removed. In preferred embodiments, the compressible body 7 and/or the outer covering 28 is/are pigmented to approximate the color of skin and/or textured to approximate appearance and/or the feel of skin.

Figure 11:
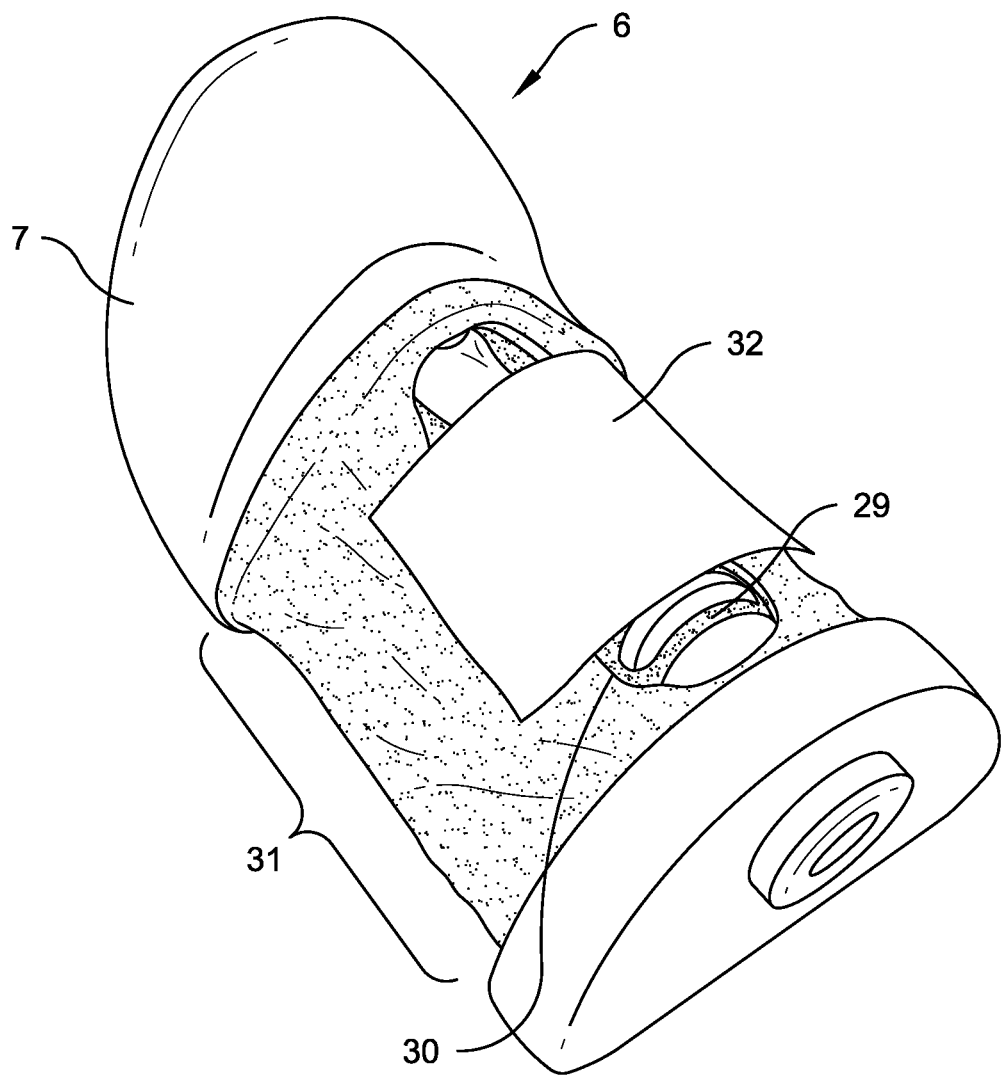
FIG. 11 is a top-side perspective view illustrating a simulant without the outer covering wherein a compressible body approximates the appearance of a neck, an inner covering is disposed along the compressible body, and an insert is partially viewable with respect to the compressible body and the inner covering in accordance with an embodiment of the invention.

Referring now to FIG. 11, the simulant 6 (outer covering 28 not shown) further includes an inner covering 32 disposed along and contacting the compressible body 7 and/or the insert 29. The inner covering 32 overlays a portion of the insert 29 disposed within the compressible body 7. In preferred embodiments, the compressible body 7 includes an opening 30 along the recess 31 so that the inner covering 32 contacts the insert 29 as well as the compressible body 7. The inner covering 32 may be secured to the insert 29 and/or the compressible body 7 via an adhesive, a hook-n-look fastener, or other suitable non-mechanical or mechanical means understood in the art. In preferred embodiments, the inner covering 32 could be mechanically fixed via contact with the outer covering 28 at one side and at least one of the insert 29 or the compressible body 7 at the other side. Regardless of the attachment approach, it is understood that the inner covering 32 should be separable from the insert 29 and/or the compressible body 7 to facilitate replacement after being penetrated.

Referring again to the FIG. 11, the inner covering 32 approximates tissue(s) of the trachea, one non-limiting example being the cricothyroid membrane. In preferred embodiments, functional aspects of the inner covering 32 should simulate the response of a trachea when traversed. In one non-limiting example, the inner covering 32 could approximate the mechanical resistance, alone or in combination with the outer covering 28, typically encountered when penetrating a trachea. In another non-limiting example, the inner covering 32 could approximate either an audible "pop" or a "pop" sensation, such as described by way of a non-limiting example in Student Manual FMST 1418 issued by the United States Marine Corps, made when the cricothyroid membrane or other membrane of the trachea is penetrated. In some embodiments, an inner covering 32 including a paper coated and/or impregnated with a resin was sufficient to approximate the desired response. In preferred embodiments, the combination of resin and paper should form a flexible element. A non-limiting example of the paper is 20-pound, multi-use copy paper. A non-limiting example of the resin is silicone model no. KE-1300T sold by Shin-Etsu Silicones of America, Inc. located in Akron, Ohio. In preferred embodiments, the resin may be applied to the paper and then squeegeed.

Figure 12:
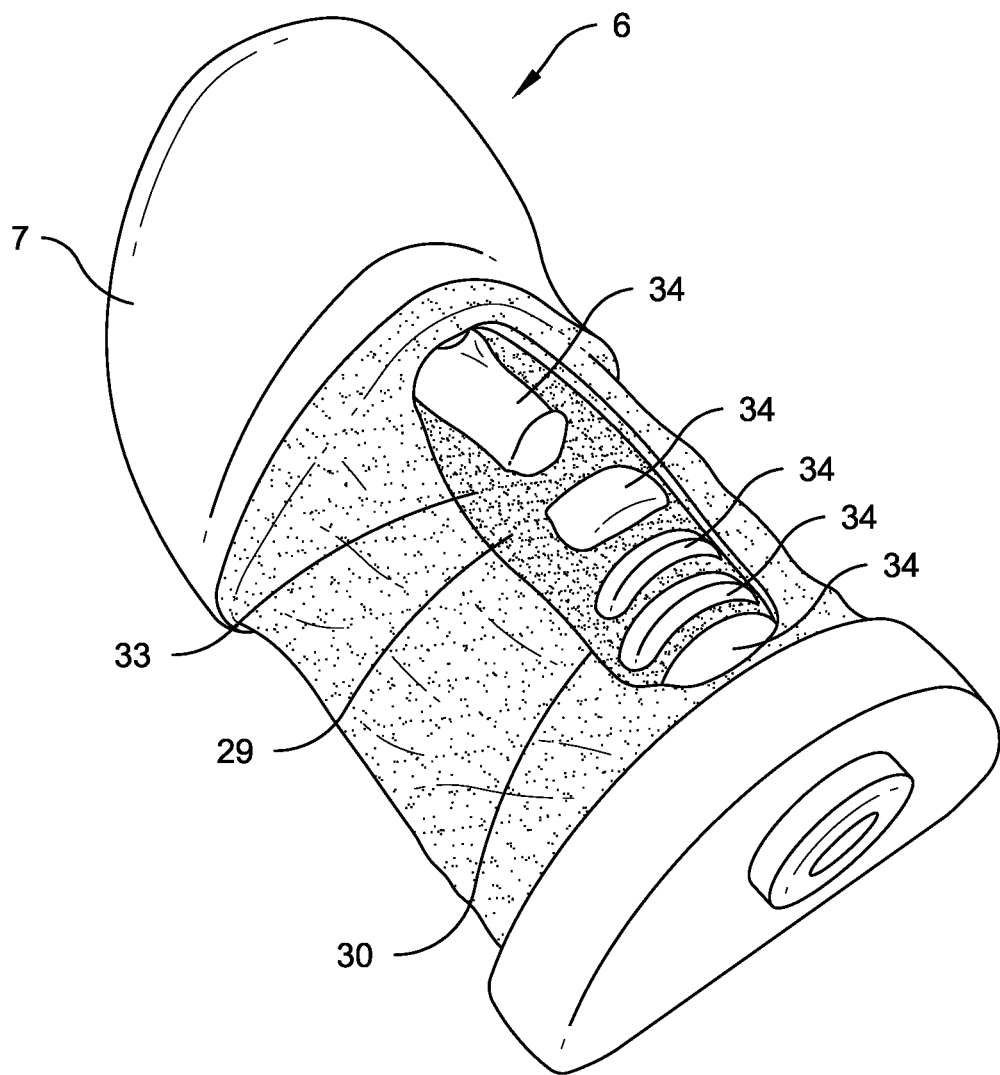
FIG. 12 is a top-side perspective view illustrating a simulant without the outer covering and the inner covering wherein a compressible body approximates the appearance of a neck and an insert includes a substructure and ridges to approximate the appearance of a trachea in accordance with an embodiment of the invention.

Referring now to FIG. 12, the simulant 6 (outer covering 28 and inner covering 32 not shown) includes an insert 29 disposed within the compressible body 7. The insert 29 is an elongated, tube-shaped element which traverses the compressible body 7 so as to approximate appearance and features of a trachea. The insert 29 includes a substructure 33 which approximates tissue(s) of the trachea and at least two ridges 34 which approximate cartilages along the trachea, non-limiting examples being the thyroid cartilage and the cricoid cartilage. The substructure 33 is shaped and dimensioned to approximate a trachea. The substructure 33 may be pigmented and/or textured to approximate the appearance of tissues. The substructure 33 may be fabricated from one or more cold-castable resins, preferable silicone. The resin(s), shape, and/or thickness of the substructure 33 is/are preferred to approximate the deformability and the resiliency of a trachea. The ridges 34 are shaped, dimensioned and positioned along the exterior of the substructure 33 to approximate cartilages along a trachea critical to proper placement of an emergency airway. The ridges 34 may be pigmented and/or textured to approximate the appearance of cartilage. A ridge 34 may be fabricated from one or more cold-castable resins, preferable urethane. The resin(s), shape, and/or thickness of each ridge 34 is/are preferred to approximate the less deformable aspect of the cartilages with respect to the tissues approximated by the substructure 33. In preferred embodiments, the ridges 34 are rigid and extend outward from the exterior of the substructure 33.

Figure 13:
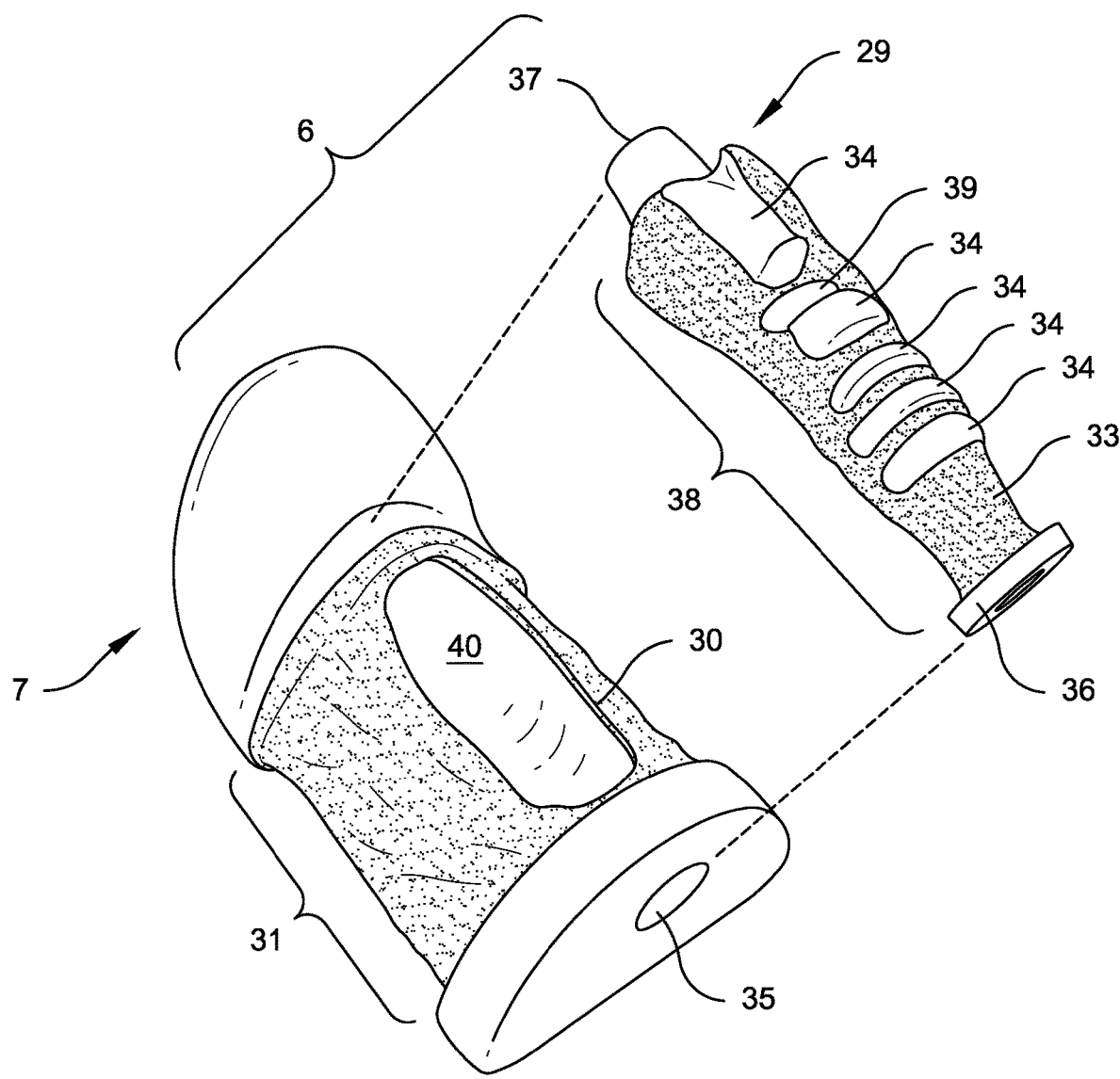
FIG. 13 is an exploded view illustrating a simulant without the outer covering and the inner covering wherein a compressible body approximates the appearance of a neck and an insert approximates portions of a trachea in accordance with an embodiment of the invention.
Figure 15:
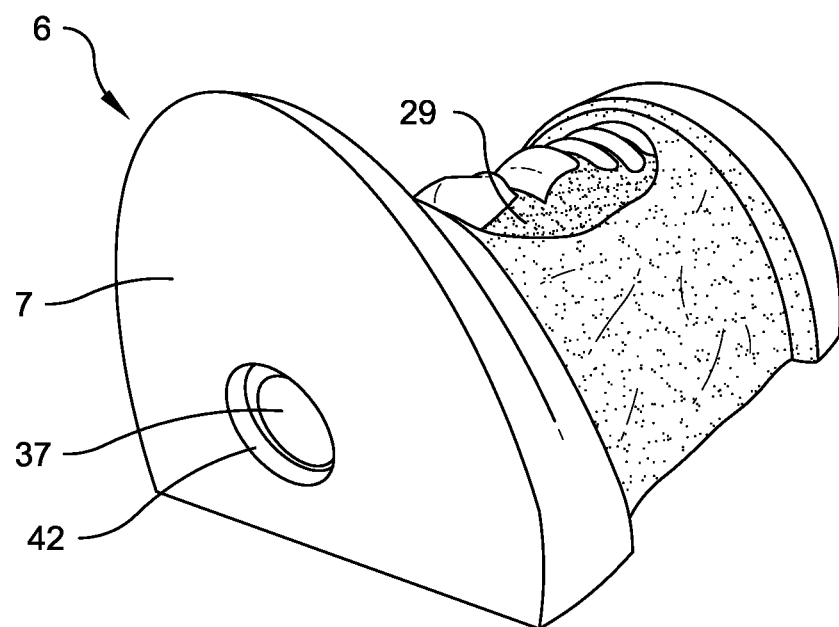
FIG. 15 is a perspective view illustrating arrangement between a compressible body and an insert at one end of a simulant in accordance with an embodiment of the invention.

Referring now to FIGS. 12 and 13, the substructure 33 generally includes an intermediate portion 38 disposed between a stop 36, one non-limiting example being a flange-like projection, and an extension 37, one non-limiting example being a tube-like projection, whereby the ridges 34 are preferred along the intermediate portion 38. The insert 29 is preferred to be separable from the compressible body 7. This feature is advantageous in that either the insert 29 or the compressible body 7 is replaceable if damaged during use. A cavity 40 within the compressible body 7 is sized and dimensioned to receive the insert 29. The insert 29 is secured within the cavity 40 of the compressible body 7, preferably via mechanical means such as by way of contact between the insert 29 and wall(s) of the cavity 40. The intermediate portion 38 of the insert 29 is positioned within the compressible body 7 so that the opening 30 along the recess 31 is disposed about the ridges 34. The opening 30 ensures that the ridges 34 are locatable when a force is applied via a finger or an instrument to the exterior of the outer covering 28. The opening 30 also permits for disassembly and assembly of the insert 29 with respect to the compressible body 7 whereby the insert 29 is pulled from and inserted into the cavity 40 by way of the opening 30, however other assembly/disassembly methods are possible. The stop 36 end of the insert 29 extends adjacent to a first hole 35 at one end of the compressible body 7. The stop 36 contacts the outer surface of the compressible body 7 about the first hole 35 so as to resist relative motion between the compressible body 7 and the insert 29 during use of the wound box trainer 1. The extension 37 engages a like-size portion of the cavity 40 to secure the insert 29 to the compressible body 7 within a second hole 42 at another end of the simulant 6, such as illustrated in FIG. 15. In some embodiments, the insert 29 may include a hole 39 disposed between two ridges 34. This feature is advantageous in that it avoids cutting the insert 29 when establishing an emergency airway.

Figure 14:
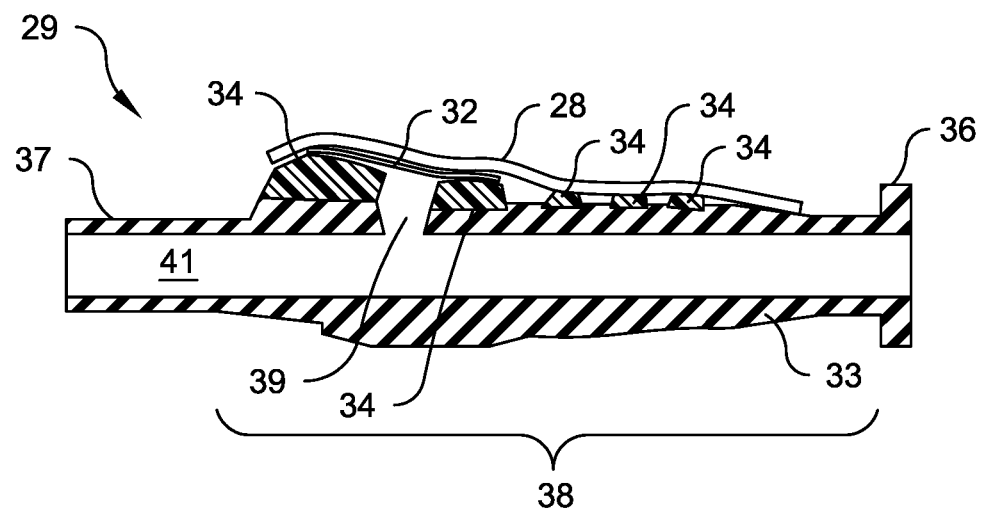
FIG. 14 is a cross-section view illustrating an insert which approximates portions of a trachea wherein an inner covering approximates penetrable tissue(s) of a trachea and an outer covering approximates penetrable outer tissue(s) of a neck in accordance with an embodiment of the invention.

Referring now to FIG. 14, the insert 29 in preferred embodiments includes a passageway 41 which traverses the extension 37, the intermediate portion 38, and the stop 36 to approximate an airway through a trachea. The passageway 41 may be molded, such as by cold-cast methods, or mechanically formed, such as by drilling, during fabrication of the substructure 33. The hole 39 may also be molded or mechanically formed during fabrication of the substructure 33. The ridges 34 may be molded onto the substructure 33, such as by cold-cast methods. The ridges 34 may or may not require sanding or other finishing to approximate the shapes of the cartilage elements. In some embodiments, the ridges 34 are formed along the substructure 33 so as to be locatable by sliding an instrument, such as an intubation bougie, along the substructure 33 within the passageway 41 adjacent to the ridges 34. This functionality may be facilitated by recessing the ridges 34 within the substructure 33 or by minimizing the wall thickness of the substructure 33 in contact with the ridges 34 or by a smaller inner diameter along the substructure 33 in contact with the ridges 34. This feature of the insert 29 is advantageous with a task-specific procedure which includes a step to determine whether the emergency airway is properly located along a trachea by way of the cartilages.

Referring again to FIG. 14, the inner covering 32 is disposed along and contacts the insert 29. In preferred embodiments, the inner covering 32 is positioned over the hole 39 and contacts the ridges 34 about the hole 39 so that the outer covering 28 overlays and contacts the inner covering 32 thereby sandwiching the inner covering 32 between the outer covering 28 and the insert 29 via the ridges 34. In other embodiments, the inner covering 32 may reside within the space between the ridges 34 and overlay the hole 39 so that the outer covering 28 does not contact the inner covering 32. Other contacting and non-contacting arrangements with respect to the outer covering 28, the insert 29, and the inner covering 32 are possible.

Referring now to FIGS. 16-20, the wound box trainer 1 may be configured with a simulant 6 which approximates a muscle to facilitate practice of a task-specific procedure specific to administering an intramuscular injection. This form of the wound box trainer 1 permits a user to create a wound required for treatment of another wound either simulated or not simulated by the simulant 6. In one example, the wound is the opening formed by a user via a needle of a syringe and the other wound is an injury necessitating an injection via a syringe. The other wound may be simulated as described herein by way of the non-limiting examples of the wound structure 8 with or without the annular cavity 13 in FIGS. 1-8. Approximate may include at least one of feature, appearance, shape, color, dimension(s), location, texture, feel, fluid reception, deformability, or resiliency.

Figure 16:
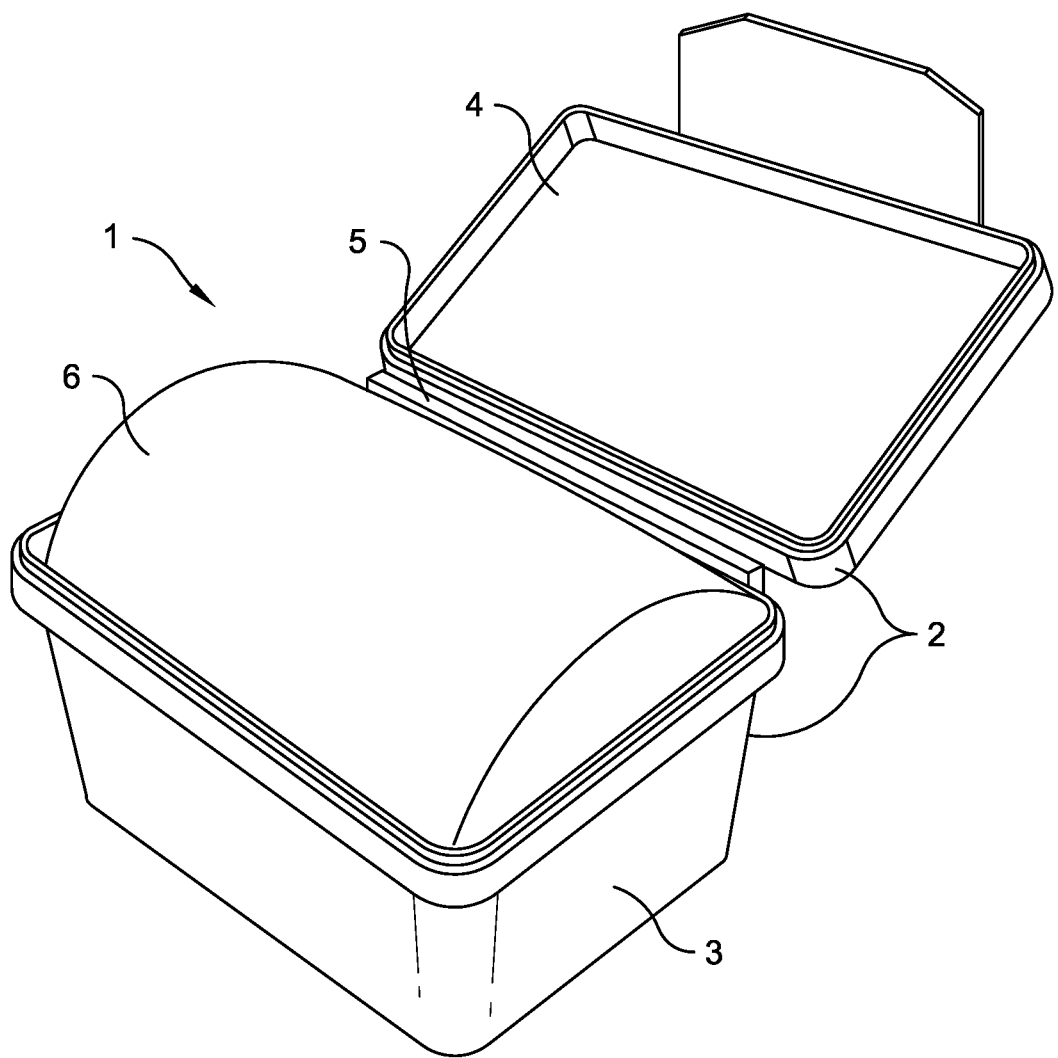
FIG. 16 is a top-side perspective view illustrating a wound box trainer including a simulant disposed within an optional case with an optional base and an optional lid wherein the simulant approximates the appearance of a muscle region for use with training specific to an intramuscular injection in accordance with an embodiment of the invention.

Referring now to FIG. 16, the wound box trainer 1 may include a simulant 6 shaped to approximate a muscle region, non-limiting examples including a deltoid muscle of an arm, a vastus lateralis muscle of a thigh, a ventrogluteal muscle of a hip, or a dorsogluteal muscle of a buttock. The simulant 6 may generally include the curvature and other visual features of a muscle. In some embodiments, it may be beneficial to include features adjacent to a muscle. The simulant 6 may reside within an optional case 2 including an optional base 3 with or without an optional lid 4. The lid 4 may be secured to the base 3 via an optional hinge 5. In other embodiments, the base 3 may be integral to and an extension of the compressible body 7 such as described by way of the compressible body 25 and the base 26 in FIG. 8. The case 2 may surround the simulant 6 in part or whole when the wound box trainer 1 is not in use.

Figure 17:
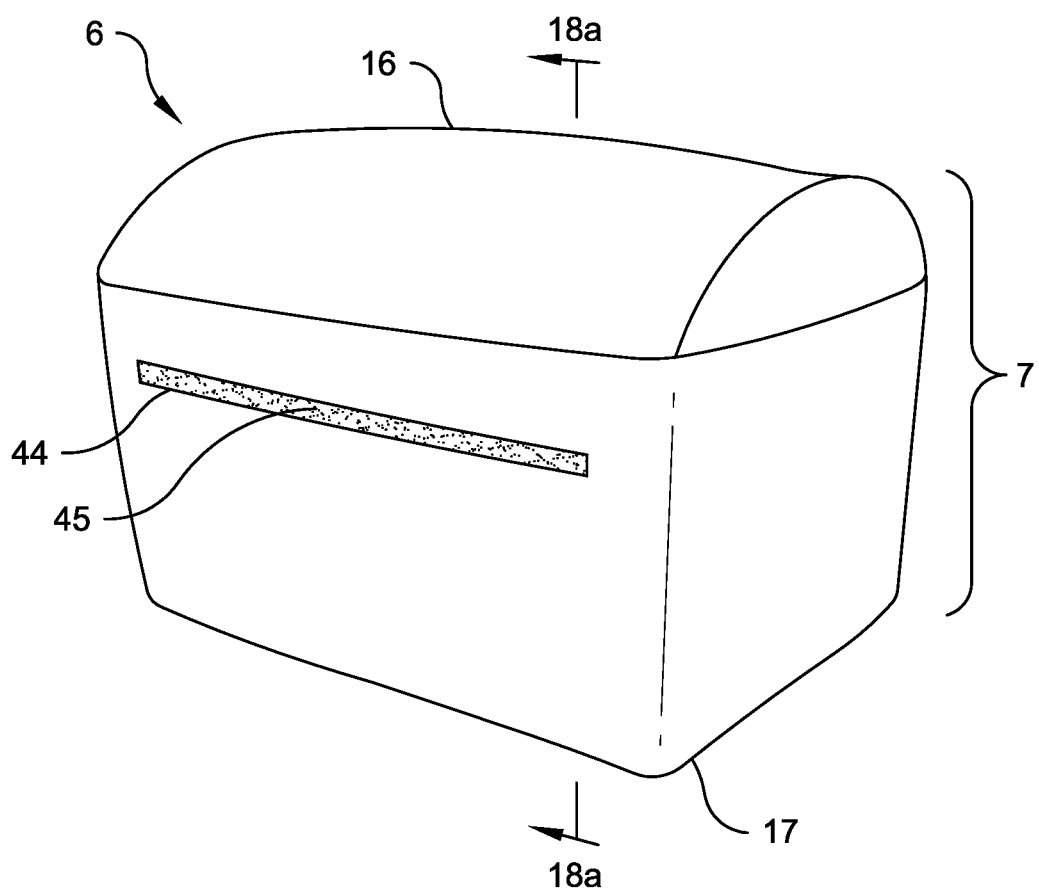
FIG. 17 is a perspective view illustrating a simulant wherein a compressible body approximates the appearance of a muscle, a slot extends into the compressible body from one side, and a fill approximating fluid receptive tissues of a muscle resides within the slot in accordance with an embodiment of the invention.

Referring now to FIG. 17, the simulant 6 includes a compressible body 7, a slot 44, and a fill 45. The compressible body 7 approximates the external appearance and features of a muscle in part or whole. The compressible body 7 may or may not include features approximating the appearance of other tissues or body regions adjacent to the muscle. In preferred embodiments, the top surface 16 of the compressible body 7 is curved so as to extend outward from the base 3, the latter illustrated in FIG. 16, and the bottom surface 17 is flat so as to contact a similar-shaped wall at the bottom of the base 3. Other shapes are possible for the top surface 16 and the bottom surface 17.

Referring again to FIG. 17, the compressible body 7 may include one or more layers of one or more polymer materials, one non-limiting example of the latter being a cold-castable resin such as silicone. The compressible body 7 should deform when a force is applied thereto, yet be sufficiently resilient to recover an original shape in part or whole after a force is removed. In preferred embodiments, the compressible body 7 is pigmented to approximate the color of skin and/or textured to approximate appearance and/or feel of skin. In some embodiments, pigmentation and/or texturing may be limited to the top surface 16.

Figure 18A:
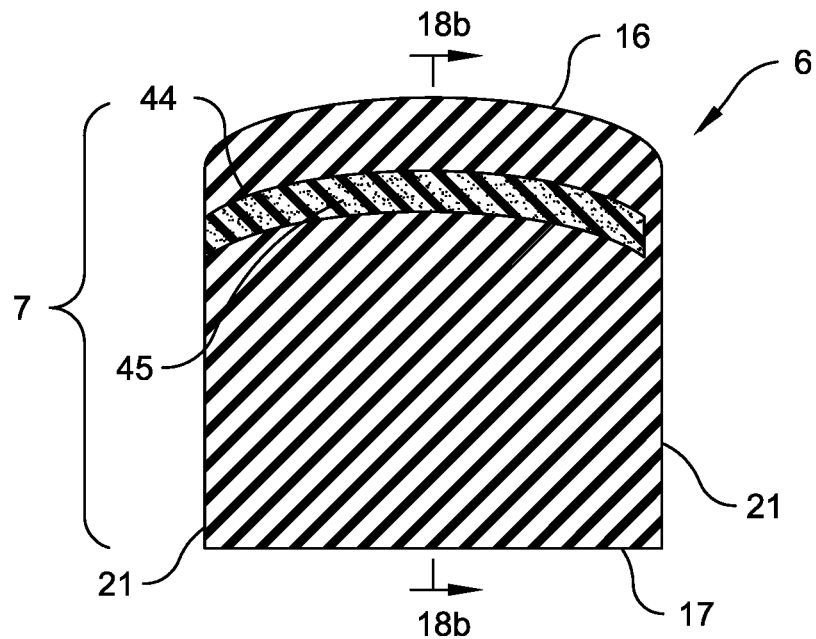
FIG. 18a is a cross-section view illustrating a simulant including a compressible body approximating a muscle with a slot extending across the minor axis of the compressible body wherein a fill within the slot approximates the absorption properties of tissues so as to receive a fluid injected into the simulant via a syringe (not shown) in accordance with an embodiment of the invention.
Figure 18B:
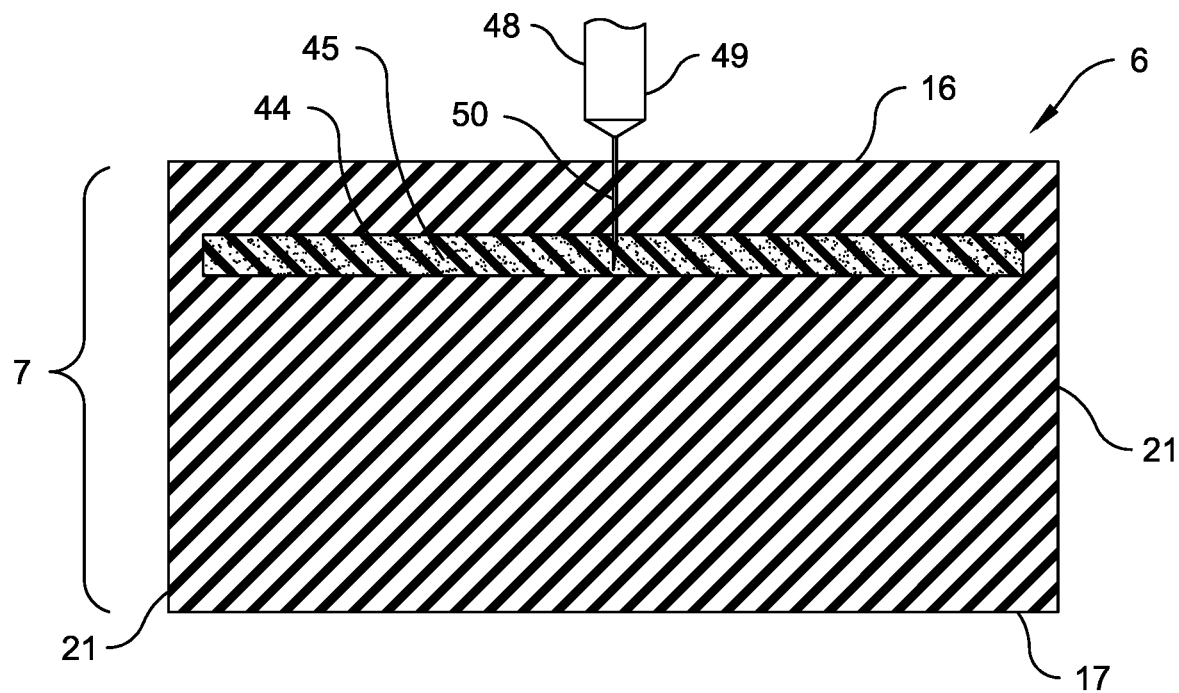
FIG. 18b is a cross-section view illustrating a simulant including a compressible body approximating a muscle with a slot extending across the major axis of the compressible body wherein a fill within the slot approximates the absorption properties of tissues so as to receive a fluid injected into the simulant via a syringe in accordance with an embodiment of the invention.

Referring now to FIGS. 18*a* and 18*b*, the slot 44 is a pocket-like structure disposed within the compressible body 7 between the top surface 16 and the bottom surface 17. The slot 44 may begin at one side 21, such as the left in FIG. 18*a*, and extends toward another side 21, such as the right in FIG. 18*a*. This arrangement permits the slot 44 to be accessible from the left side 21; however, it is understood that the slot 44 may intersect more than one side 21 in other embodiments so as to be accessible from two or more sides 21. In some embodiments, the slot 44 may form an opening at the intersection of a side 21. In other embodiments, the slot 44 may form an opening at the intersection of a side 21 whereby the slot 44 appears as either a slit or a seam. In preferred embodiments, the slot 44 extends to, but not intersect, other sides 21 of the compressible body 7, such as the right side 21 in FIG. 18*a* and both left and right sides 21 in FIG. 18*b*.

Referring again to FIGS. 18*a* and 18*b*, the slot 44 is positioned within the compressible body 7 so as to correspond to the location within a muscle into which a fluid (liquid or gas) is injectable by way of a syringe 48. In preferred embodiments, the slot 44 is curved and biased toward the top surface 16; however, other shapes and locations are possible. In some embodiments, the slot 44 may be positioned within the compressible body 7 so that a needle 50 of a syringe 48 penetrates and is properly located for an injection when a barrel 49 of the syringe 48 does not contact the top surface 16, such as illustrated in FIG. 18*b*. In other embodiments, the slot 44 may be positioned within the compressible body 7 so that a needle 50 of a syringe 48 penetrates and is properly located for an injection when a barrel 49 of the syringe 48 contacts the top surface 16.

Referring again to FIGS. 18*a* and 18*b*, the slot 44 may be fabricated via molding or non-molding methods. In one example, the slot 44 may be molded into the compressible body 7 whereby a mold tool (not shown) is located within a mold at the location of the slot 44, a resin is poured into the mold about the mold tool, and the mold tool is removed after the resin has properly cured. In another example, the slots 44 may be machined into the compressible body 7 after the resin comprising the compressible body 7 has cured.

Referring again to FIGS. 18*a*, and 18*b*, the slot 44 is dimensioned and shaped so as to receive the fill 45. In preferred embodiment, the fill 45 is separable from the compressible body 7 so as to be removably secured within the slot 44. This feature is advantageous in that either the compressible body 7 or the fill 45 may be replaced as needed. The fill 45 approximates the fluid reception properties of a muscle. The fill 45 is understood to be capable of receiving a fluid originally residing within a barrel 49 of a syringe 48 whereby the fluid is injected into the fill 45 via a needle 50 of the syringe 48. The fill 45 may hold the fluid injected there into without or with leakage. In some embodiments, the fill 45 may be a bladder which includes one or more hollows capable of receiving a fluid. The bladder may be inflatable in some embodiments so as to expand as fluid enters the bladder. The bladder may define a fixed volume in other embodiments whereby the bladder does not inflate. Other bladder designs are possible. In other embodiments, the fill 45 may include a material which is absorbent so as to soak up a fluid injected by way of a syringe 48. Absorbent materials may include, but are not limited to, powders, particles, or solids. In yet other embodiments, the fill 45 may include a material which is porous so as to retain a fluid injected by way of a syringe 48. Porous materials may include, but are not limited to, powders, particles, or solids. In still other embodiments, the fill 45 may include both absorbent and porous properties. In preferred embodiments, the fill 45 may comprise a sponge. The sponge may be expandable in some embodiments as a fluid is received by way of a syringe 48. The sponge may not be expandable in other embodiments as fluid is received by way of a syringe 48.

Figure 19:
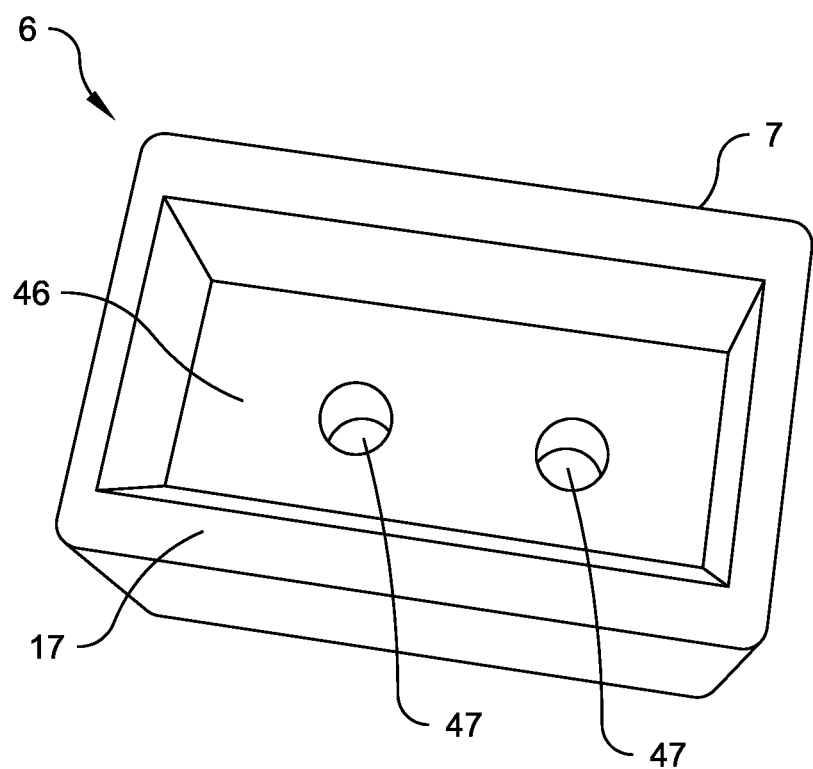
FIG. 19 is a bottom-side perspective view illustrating an optional cavity and optional channels within a compressible body in accordance with an embodiment of the invention.
Figure 20:
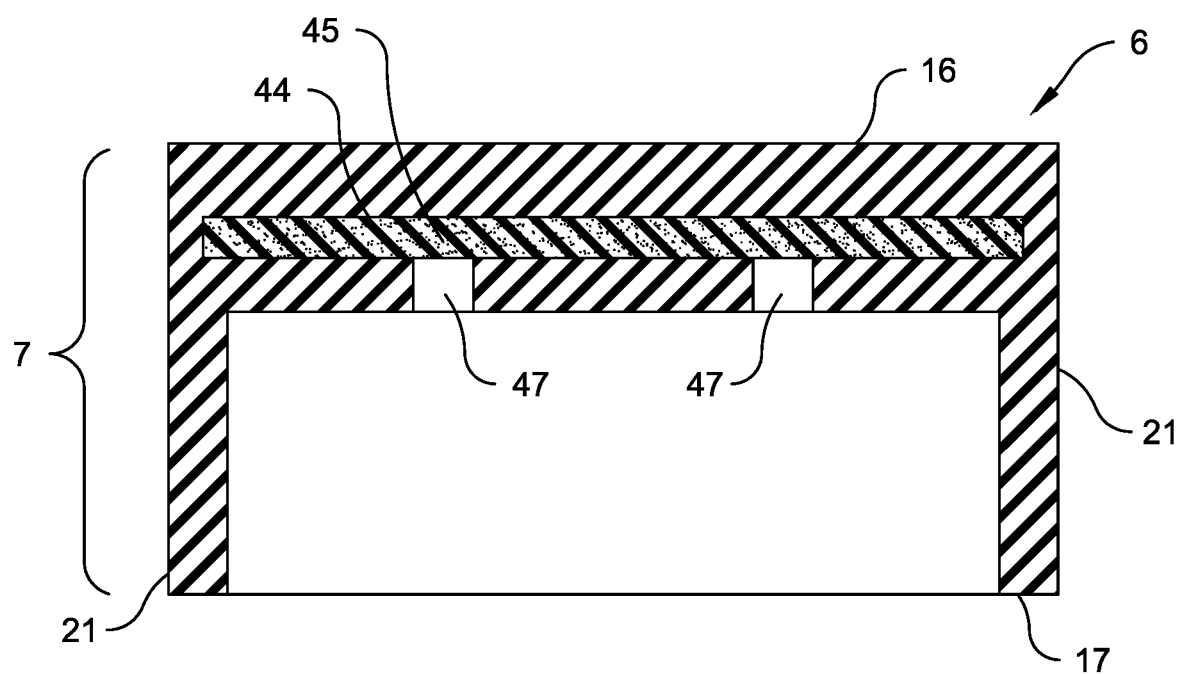
FIG. 20 is a cross-section view illustrating an optional cavity and optional channels within a compressible body with respect to a slot with a fill therein in accordance with an embodiment of the invention.

Referring now to FIGS. 19 and 20, a cavity 46 may extend into the simulant 6 from the bottom surface 17 of the compressible body 7. In preferred embodiments, the cavity 46 may extend toward but not intersect the sides 21. One or more optional channels 47 may extend from an end of the cavity 46 in the direction of the slot 44. In some embodiments, a channel 47 may intersect the slot 44, such as illustrated in FIG. 20, to provide a pathway between the slot 44 and the cavity 46.

Referring again to FIGS. 19 and 20, the cavity 46 with or without channel(s) 47 may be fabricated via molding or non-molding methods. In one example, the cavity 46 and the optional channel(s) 47 may be molded into the compressible body 7 whereby a mold tool (not shown) is located within a mold at the location of the cavity 46 and the optional channel(s) 47, a resin is poured into the mold about the mold tool, and the mold tool is removed after the resin has properly cured. In another example, the cavity 46 and/or the optional channel(s) 47 may be machined into the compressible body 7 after the resin comprising the compressible body 7 has cured.

Referring again to FIGS. 19 and 20, the cavity 46 and the optional channel(s) 47 may provide certain advantages. In some embodiments, the cavity 46 and the optional channel(s) 47 may simplify manufacture or may decrease manufacture time by reducing cure time. In other embodiments, the cavity 46 and the optional channel(s) 47 may reduce the weight of the compressible body 7. In yet other embodiments, the optional channel(s) 47 may permit a fluid within the fill 45 to drain into the cavity 46 when the optional channel(s) 47 extends to, so as to intersect, the slot 44. The latter advantage may be realized in some embodiments when a user applies a compressive force onto the fill 45 by way of the top surface 16 or in other embodiments without compression as a fluid leaks from the fill 45.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A wound trainer for medical training purposes comprising:
    (a) a compressible body which simulates portion of a body, said compressible body includes a top surface;
    (b) a wound structure disposed along said compressible body, said wound structure includes a wound cavity which extends into said compressible body from said top surface; and
    (c) an annular cavity which extends into said compressible body about said wound cavity, said annular cavity permits, in use, movement of a wall defined by and between said wound cavity and said annular cavity.

2. The wound trainer of claim 1, wherein said compressible body includes a surface layer and a subsurface layer.

3. The wound trainer of claim 1, wherein said compressible body includes a surface layer being pigmented.

4. The wound trainer of claim 1, wherein said annular cavity and said wound cavity partially overlap.

5. The wound trainer of claim 1, wherein a surface feature being disposed about said wound cavity along said top surface, said surface feature simulates a damaged tissue.

6. The wound trainer of claim 1, wherein said annular cavity extends into said compressible body from a bottom surface of said compressible body.

7. The wound trainer of claim 1, further comprising:
    (d) an insert being disposed within said annular cavity.

8. The wound trainer of claim 1, further comprising:
    (d) a bleed tube which communicates at one end with said wound cavity.

9. The wound trainer of claim 8, wherein said bleed tube is disposed within a channel along said compressible body.

10. The wound trainer of claim 1, wherein said compressible body includes at least one runner which traverses said annular cavity.

11. A wound trainer for medical training purposes comprising:
    (a) a compressible body which simulates portion of a body, said compressible body includes a top surface;
    (b) a wound structure disposed along said compressible body, said wound structure includes a wound cavity which extends into said compressible body from said top surface; and
    (c) an annular cavity which extends into said compressible body about said wound cavity, said annular cavity permits, in use, expansion of a wall defined by and between said wound cavity and said annular cavity.

12. The wound trainer of claim 11, wherein said compressible body includes a surface layer and a subsurface layer.

13. The wound trainer of claim 11, wherein said compressible body includes a surface layer being pigmented.

14. The wound trainer of claim 11, wherein said annular cavity and said wound cavity partially overlap.

15. The wound trainer of claim 11, wherein a surface feature being disposed about said wound cavity along said top surface, said surface feature simulates a damaged tissue.

16. The wound trainer of claim 11, wherein said annular cavity extends into said compressible body from a bottom surface of said compressible body.

17. The wound trainer of claim 11, further comprising:
    (d) an insert being disposed within said annular cavity.

18. The wound trainer of claim 11, further comprising:
    (d) a bleed tube which communicates at one end with said wound cavity.

19. The wound trainer of claim 18, wherein said bleed tube is disposed within a channel along said compressible body.

20. The wound trainer of claim 11, wherein said compressible body includes at least one runner which traverses said annular cavity.

\* \* \* \* \*